(12) United States Patent
Mori et al.

(10) Patent No.: US 8,116,190 B2
(45) Date of Patent: Feb. 14, 2012

(54) RECORDING/REPRODUCING APPARATUS

(75) Inventors: Shuntaro Mori, Saitama (JP); Takanori Maeda, Saitama (JP); Kenjiro Fujimoto, Saitama (JP)

(73) Assignee: Pioneer Corporation, Tokyo (JP)

( * ) Notice: Subject to any disclaimer, the term of this patent is extended or adjusted under 35 U.S.C. 154(b) by 205 days.

(21) Appl. No.: 12/444,268

(22) PCT Filed: Oct. 5, 2006

(86) PCT No.: PCT/JP2006/319986
§ 371 (c)(1),
(2), (4) Date: May 28, 2009

(87) PCT Pub. No.: WO2008/044267
PCT Pub. Date: Apr. 17, 2008

(65) Prior Publication Data
US 2010/0046350 A1    Feb. 25, 2010

(51) Int. Cl.
*G11B 9/02* (2006.01)
(52) U.S. Cl. .......................... 369/126; 850/54
(58) Field of Classification Search .................. 369/126; 850/1, 54
See application file for complete search history.

(56) References Cited

U.S. PATENT DOCUMENTS

| | | |
|---|---|---|
| 4,998,016 A | 3/1991 | Nose et al. |
| 5,396,453 A | 3/1995 | Kawada et al. |
| 7,567,497 B2 * | 7/2009 | Gidon et al. ................. 369/126 |
| 2008/0037400 A1 | 2/2008 | Gidon et al. |

FOREIGN PATENT DOCUMENTS

| | | |
|---|---|---|
| EP | 0 368 579 A2 | 5/1990 |
| JP | 02-202350 | 8/1990 |
| JP | 05-108908 | 4/1993 |
| JP | 06-139629 | 5/1994 |
| JP | 2001-195784 | 7/2001 |
| JP | 2002-049041 | 2/2002 |
| WO | WO 2005/102908 A2 | 11/2005 |

OTHER PUBLICATIONS

JPMAT (machine assisted translation of Jp 5-108908).*
International Search Report for PCT/JP2006/319986, mailed Dec. 12, 2006.

* cited by examiner

*Primary Examiner* — Aristotelis Psitos
(74) *Attorney, Agent, or Firm* — Nixon & Vanderhye, P.C.

(57) ABSTRACT

A recording/reproducing apparatus (100) is provided with: a first substrate (41) on which a recording medium (43) is mounted; and a second substrate (21) to which a recording/reproducing head (23), which performs information recording and information reproduction on the recording/reproducing medium is fixed, wherein the second substrate is relatively displaced in a predetermined direction substantially parallel to the first substrate with respect to the first substrate, a particulate (30) is placed in a gap between the first substrate and the second substrate, the particulate can be displaced with displacement of the second substrate, the particulate has a substantially circular cross section in a direction that the second substrate is displaced when the second substrate is displaced.

10 Claims, 21 Drawing Sheets

[FIG. 1]
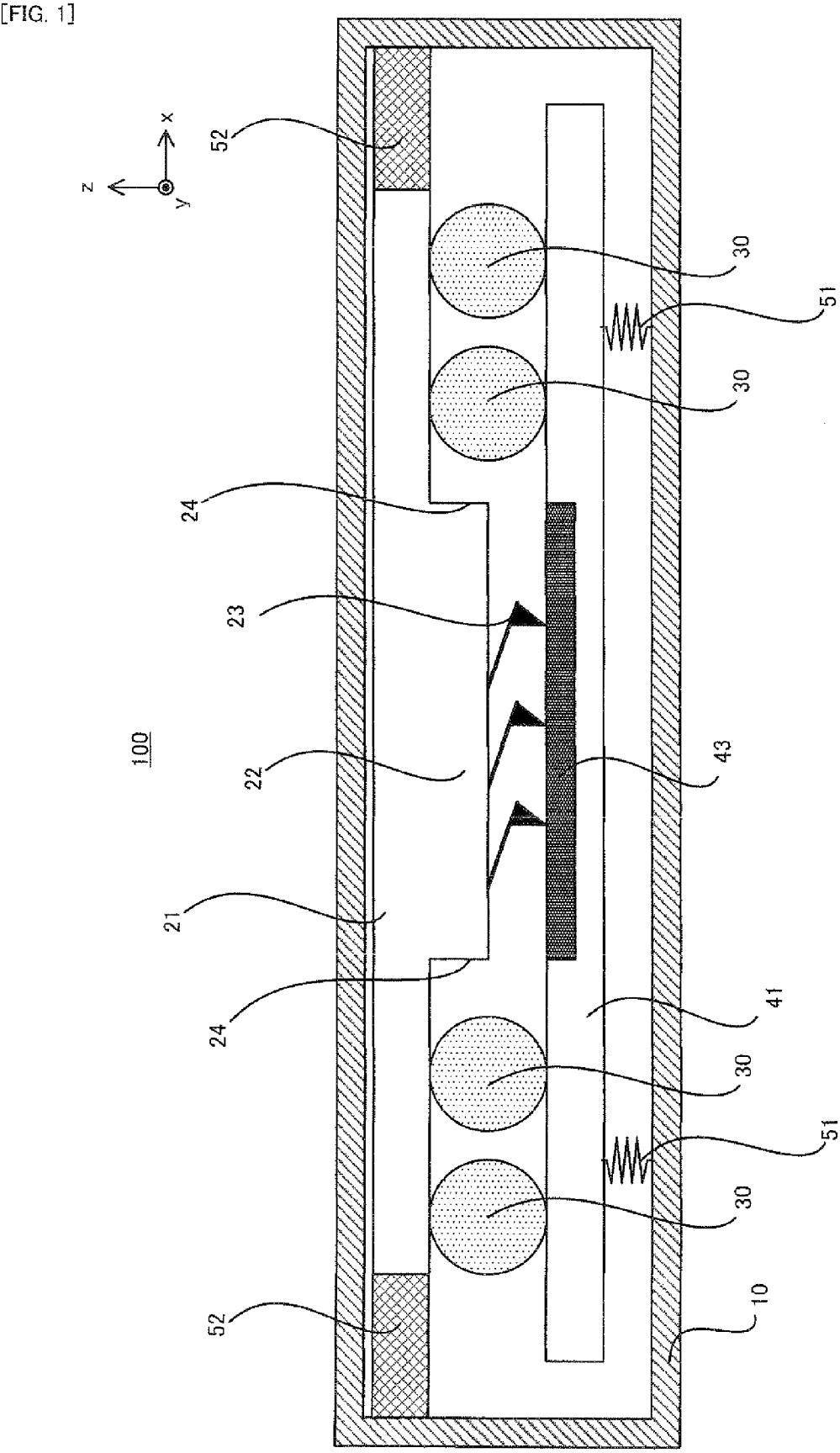

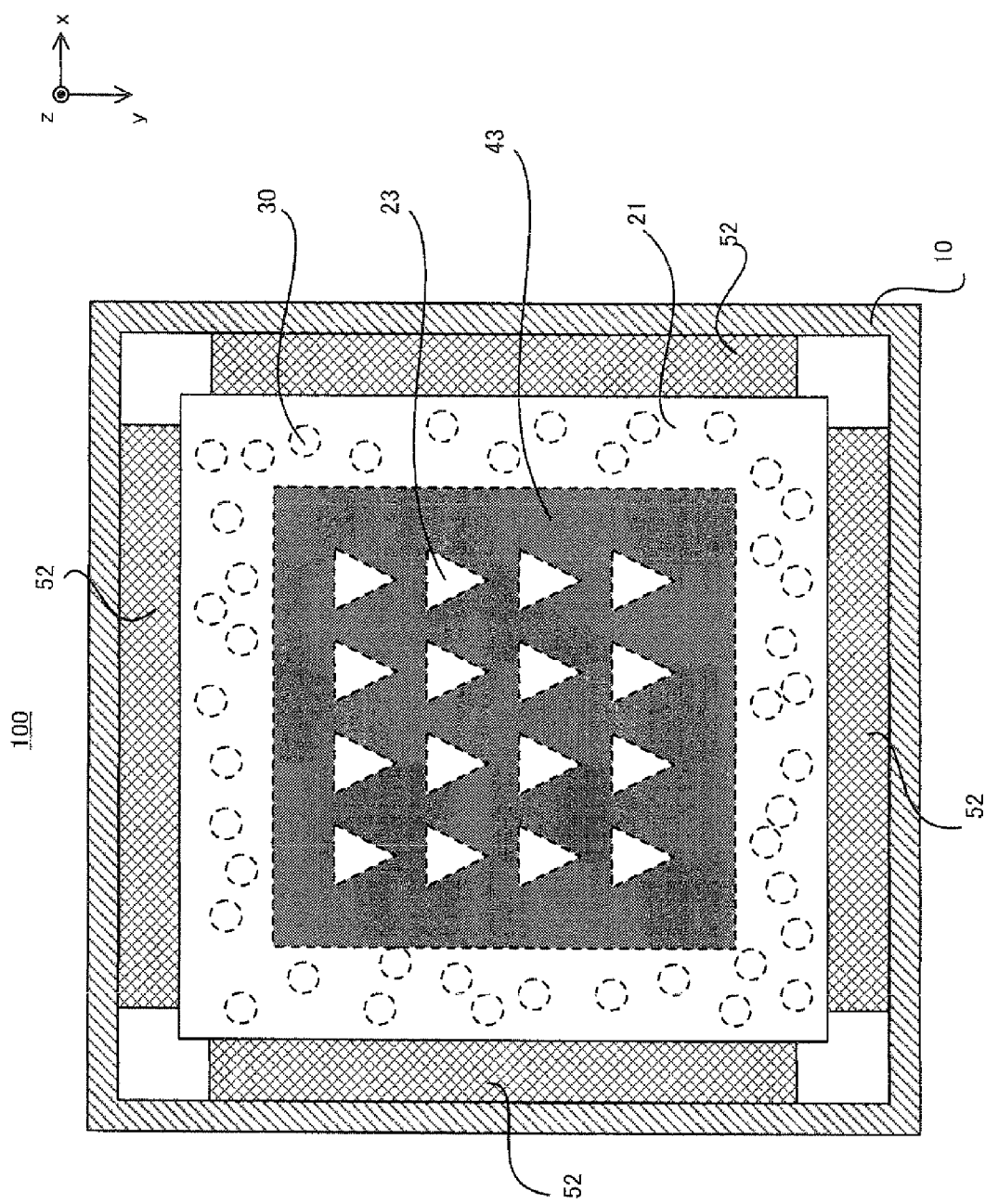
[FIG. 2]

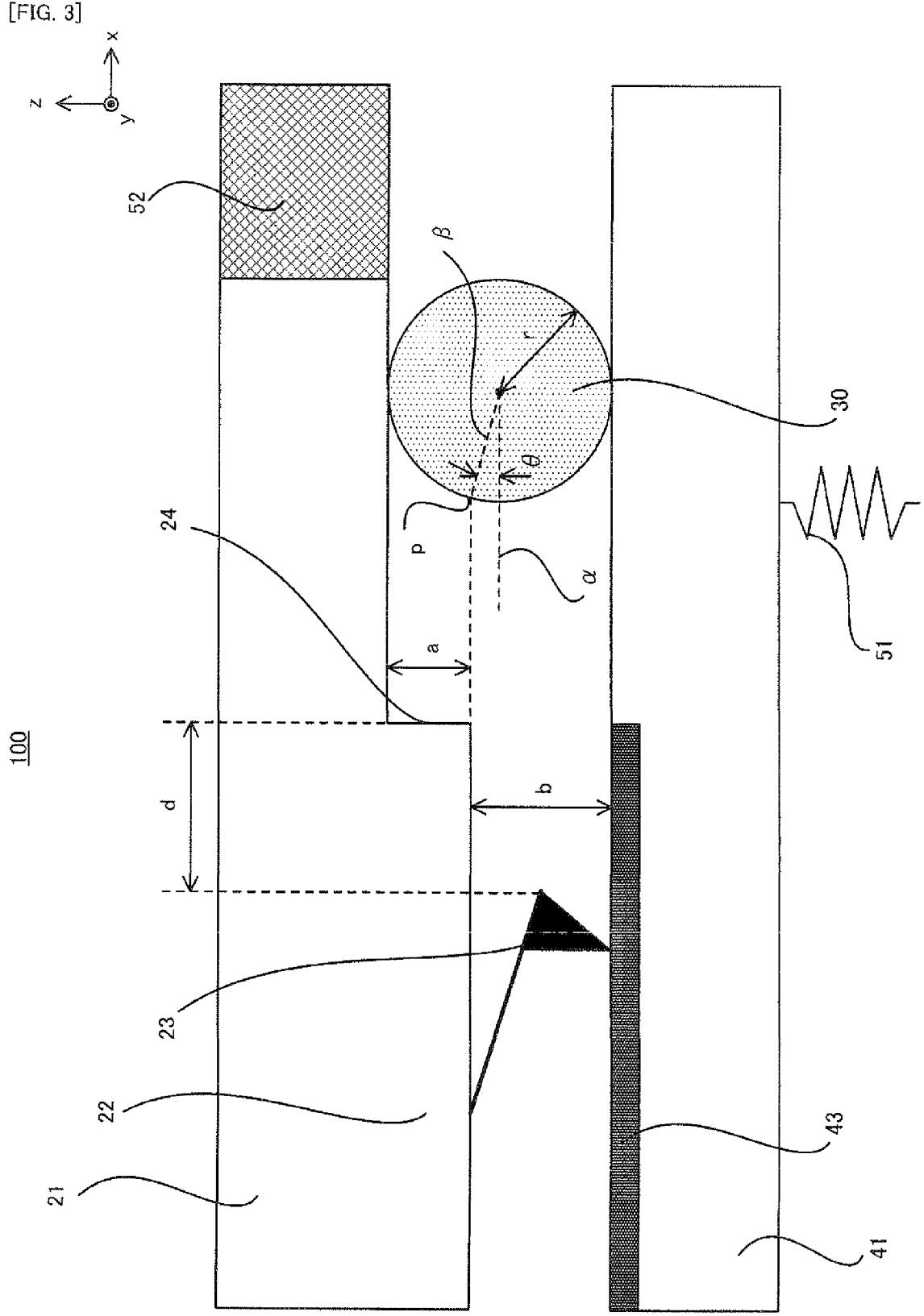
[FIG. 3]

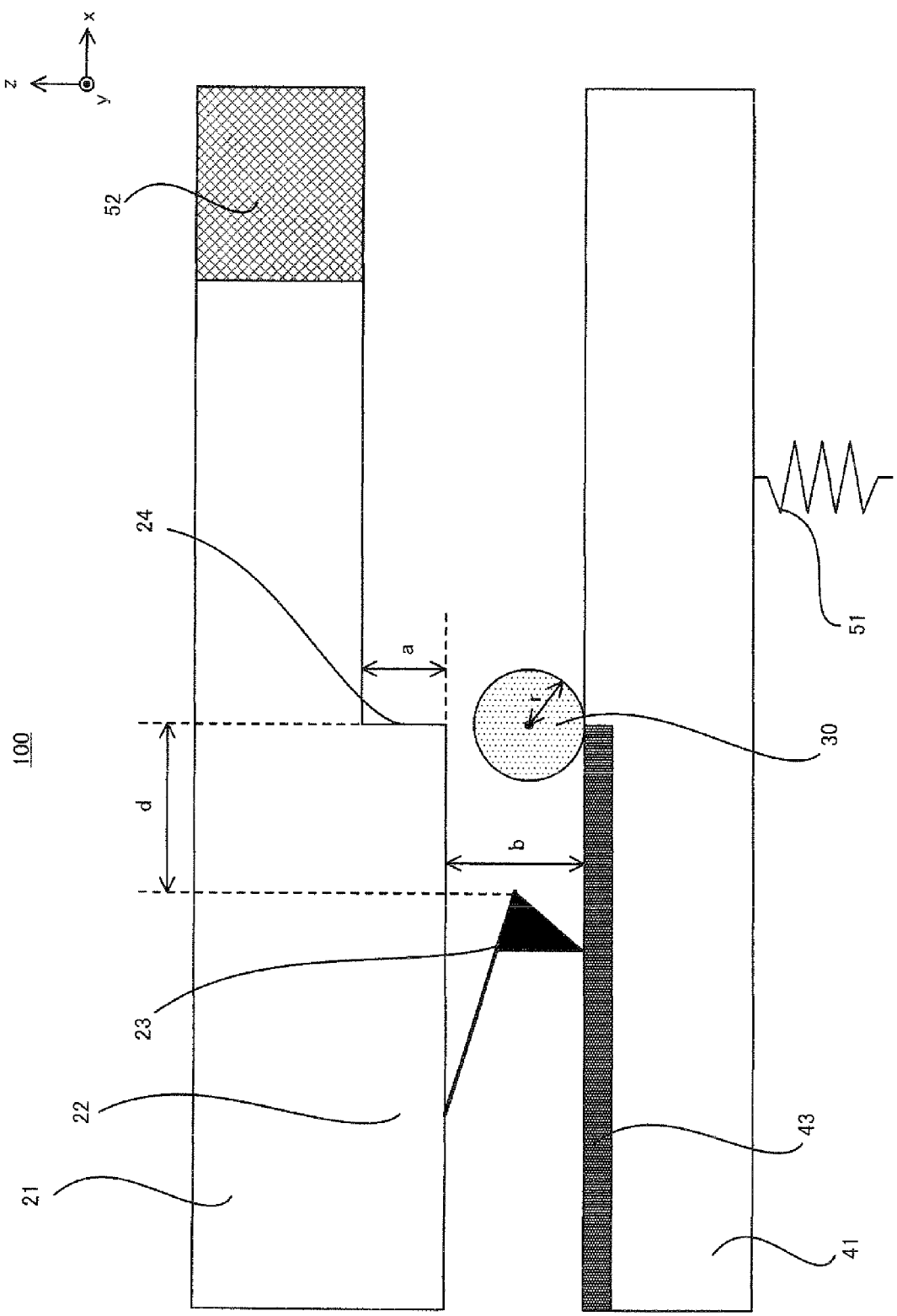

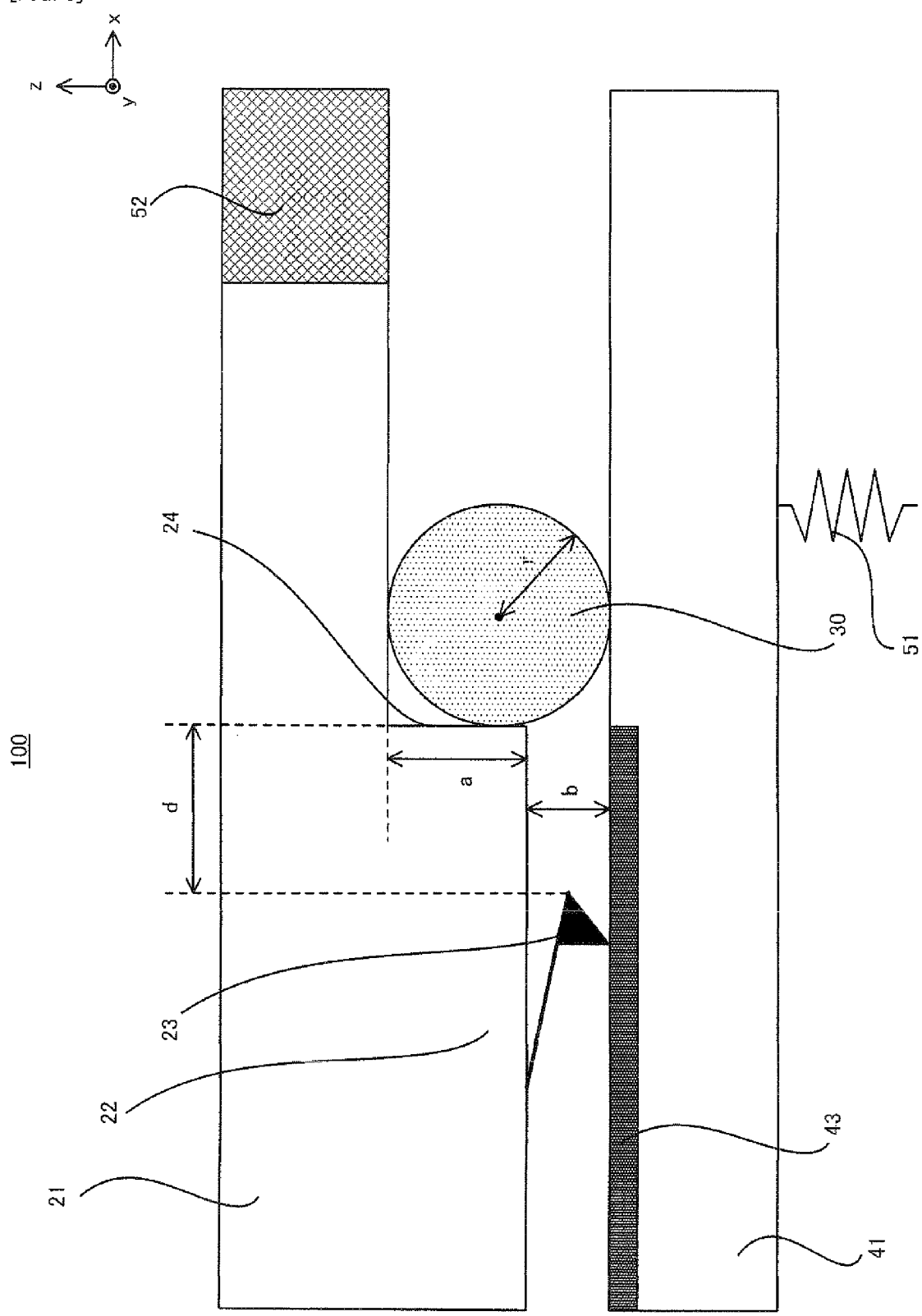
[FIG. 5]

[FIG. 6]
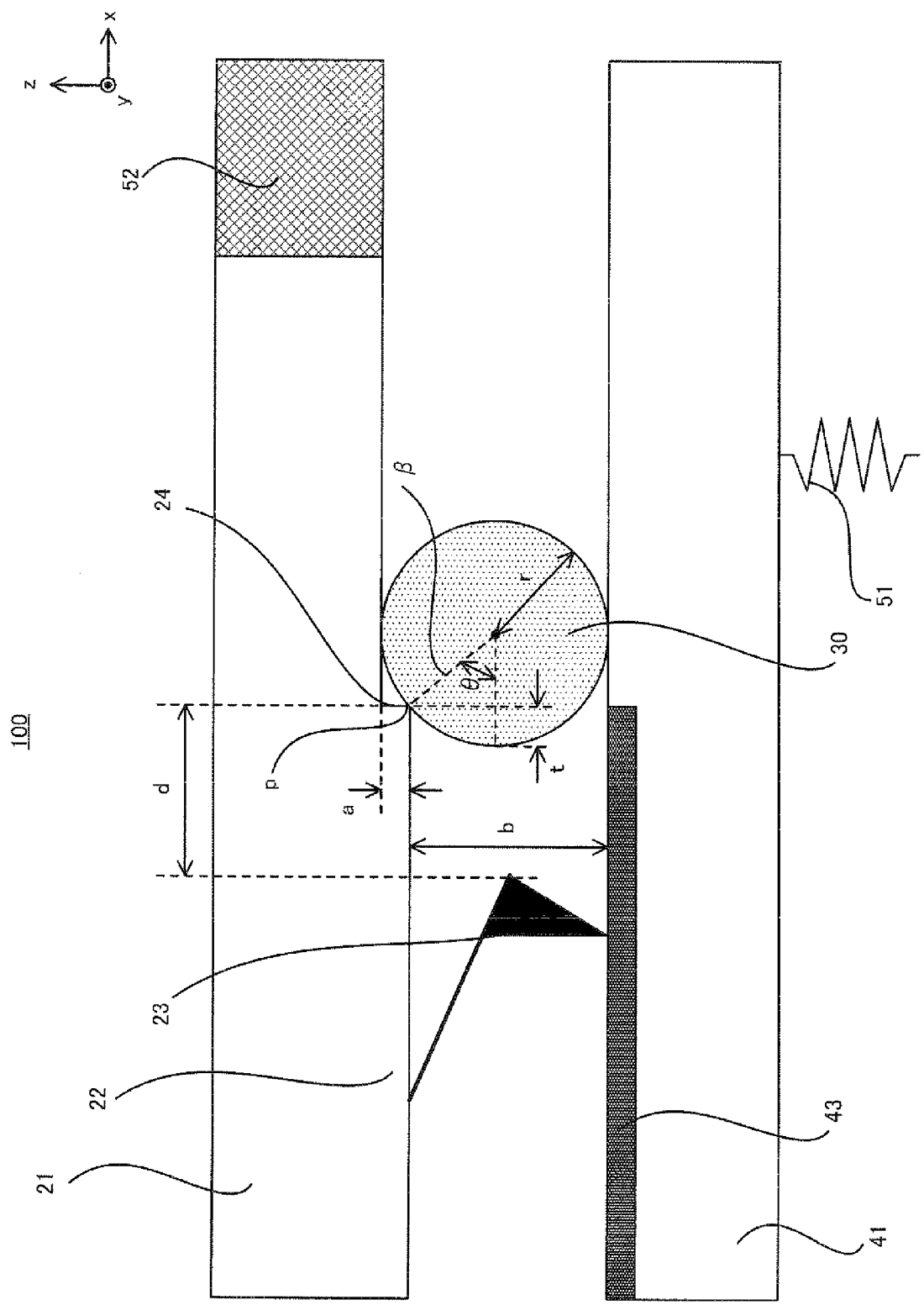

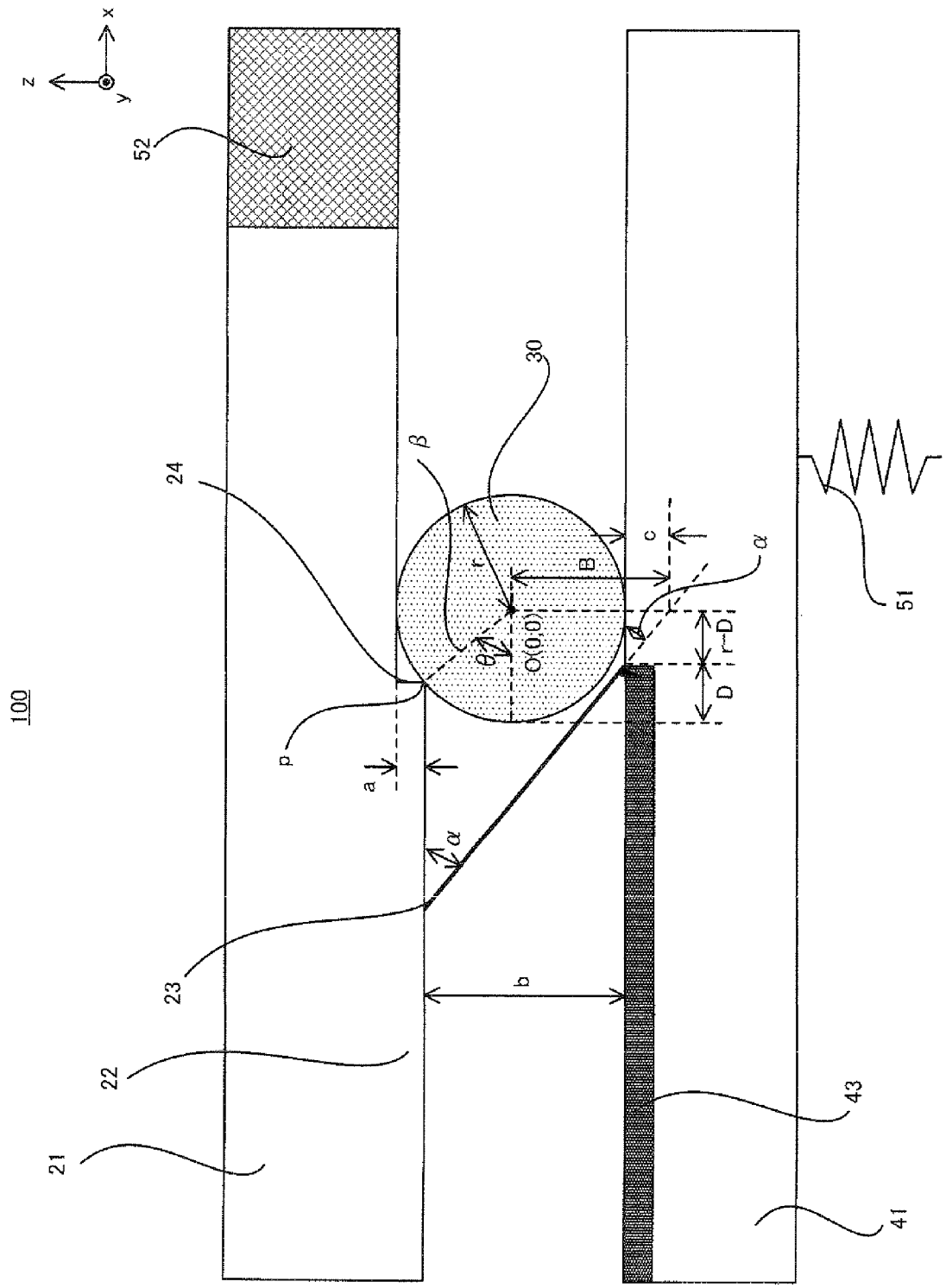
[FIG. 7]

[FIG. 8]
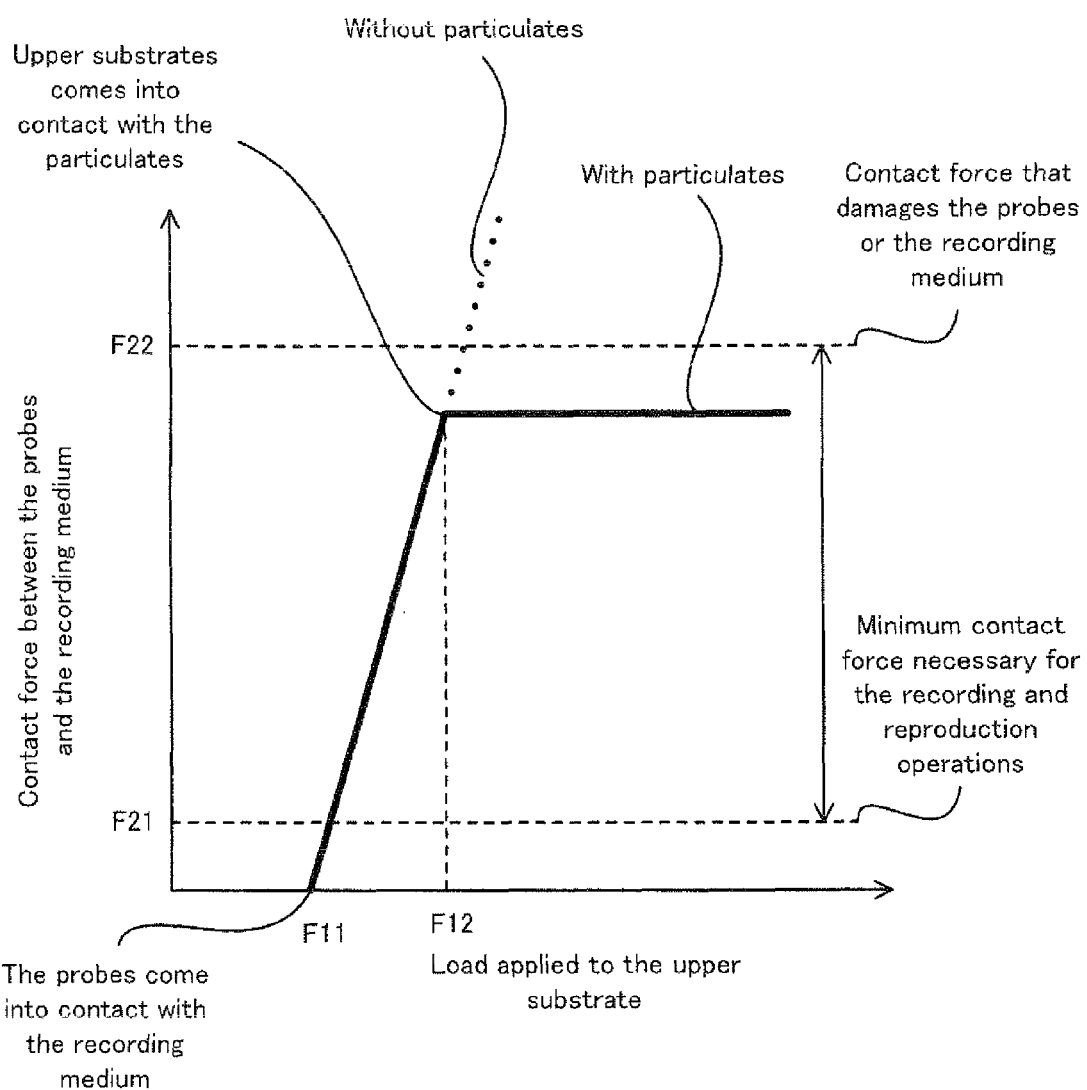

[FIG. 9]
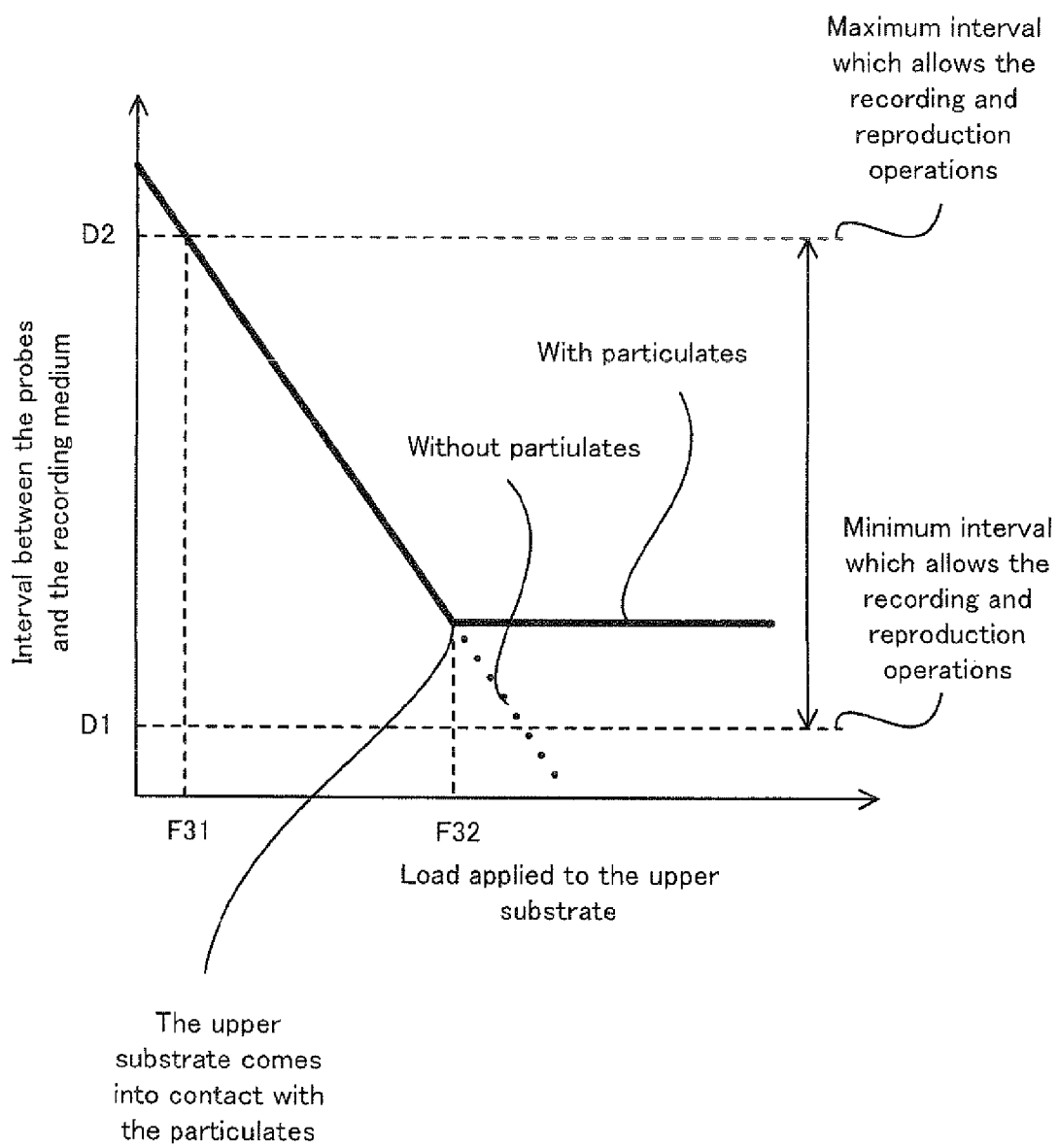

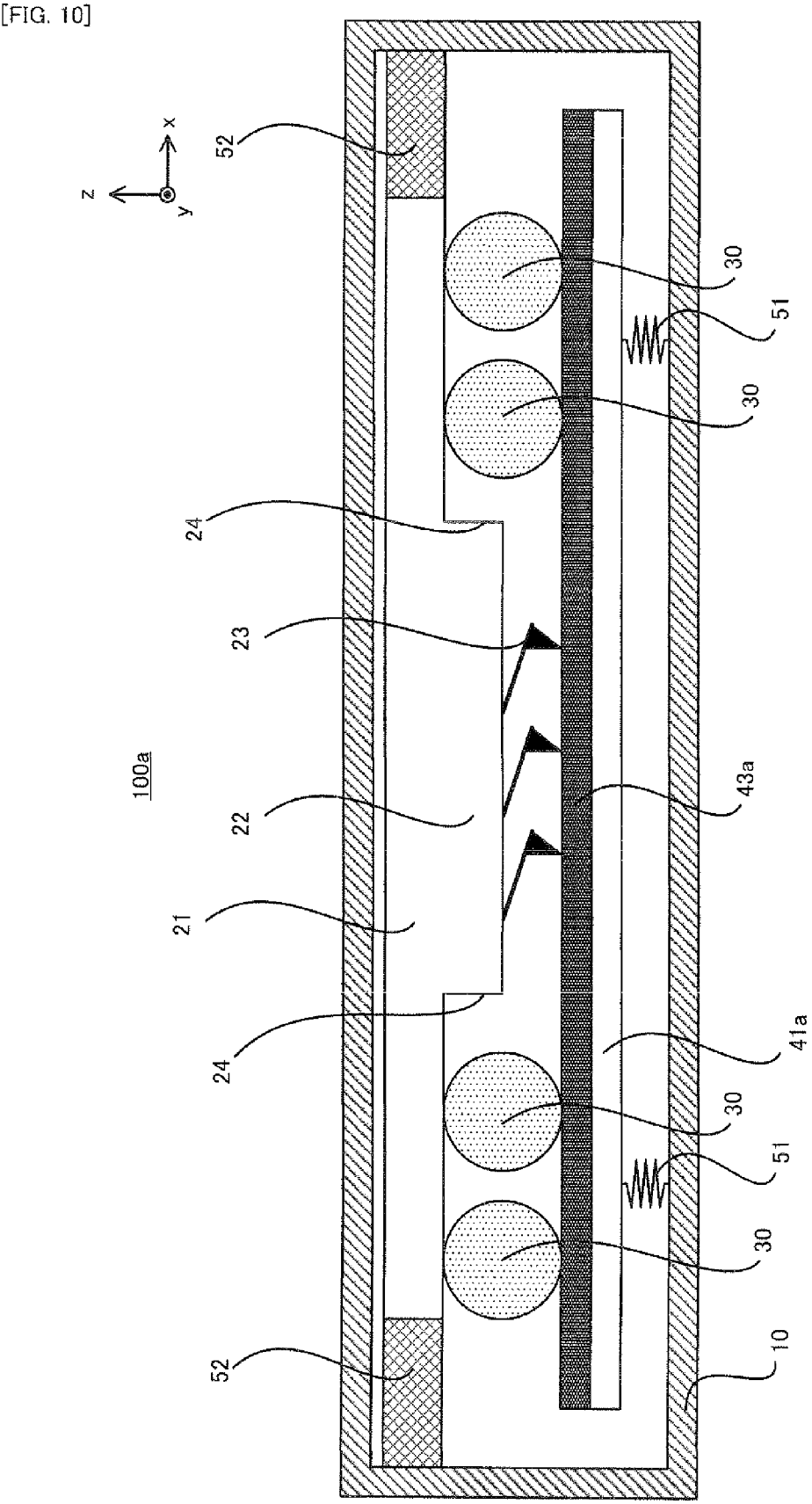

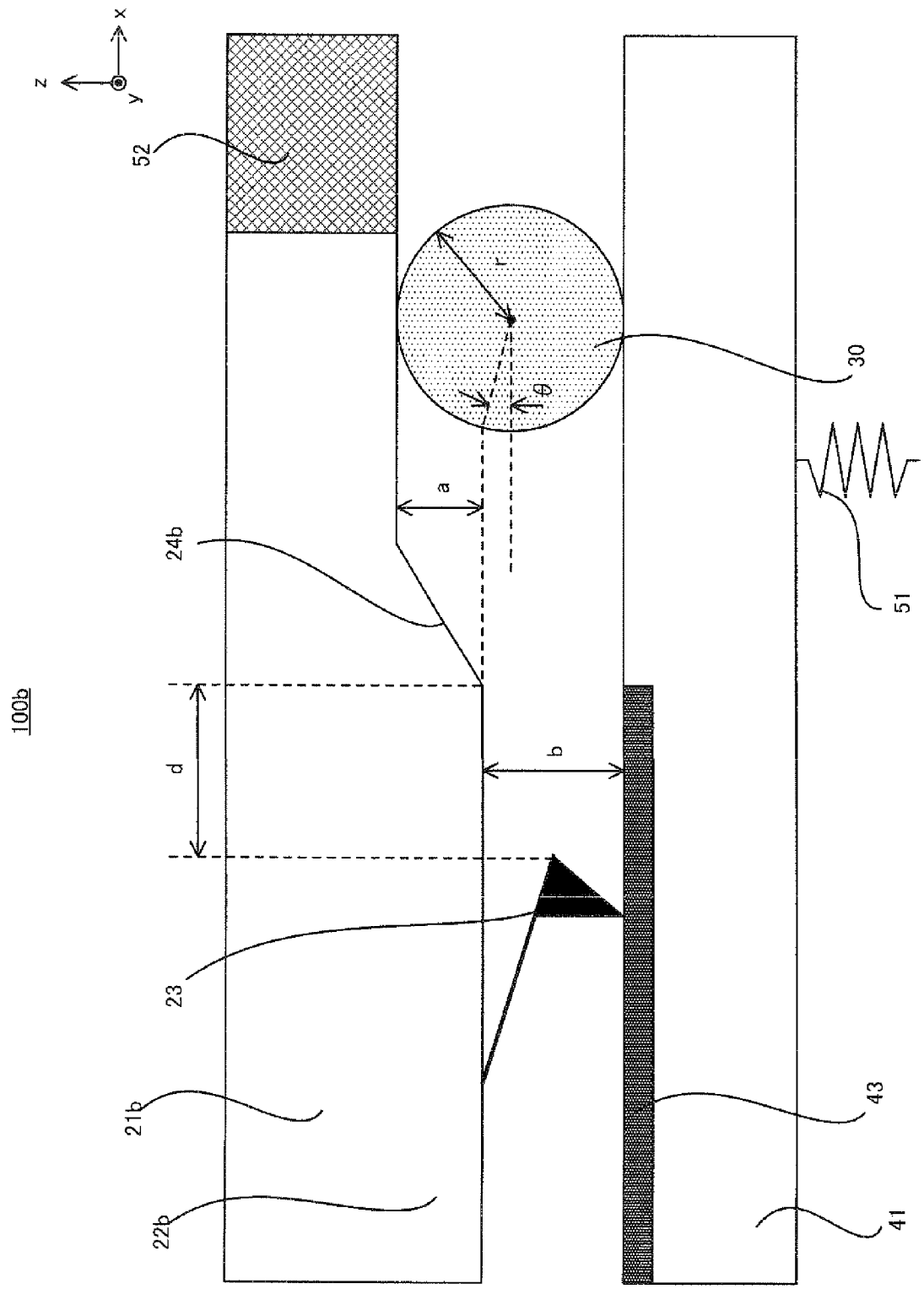
[FIG. 11]

[FIG. 12]
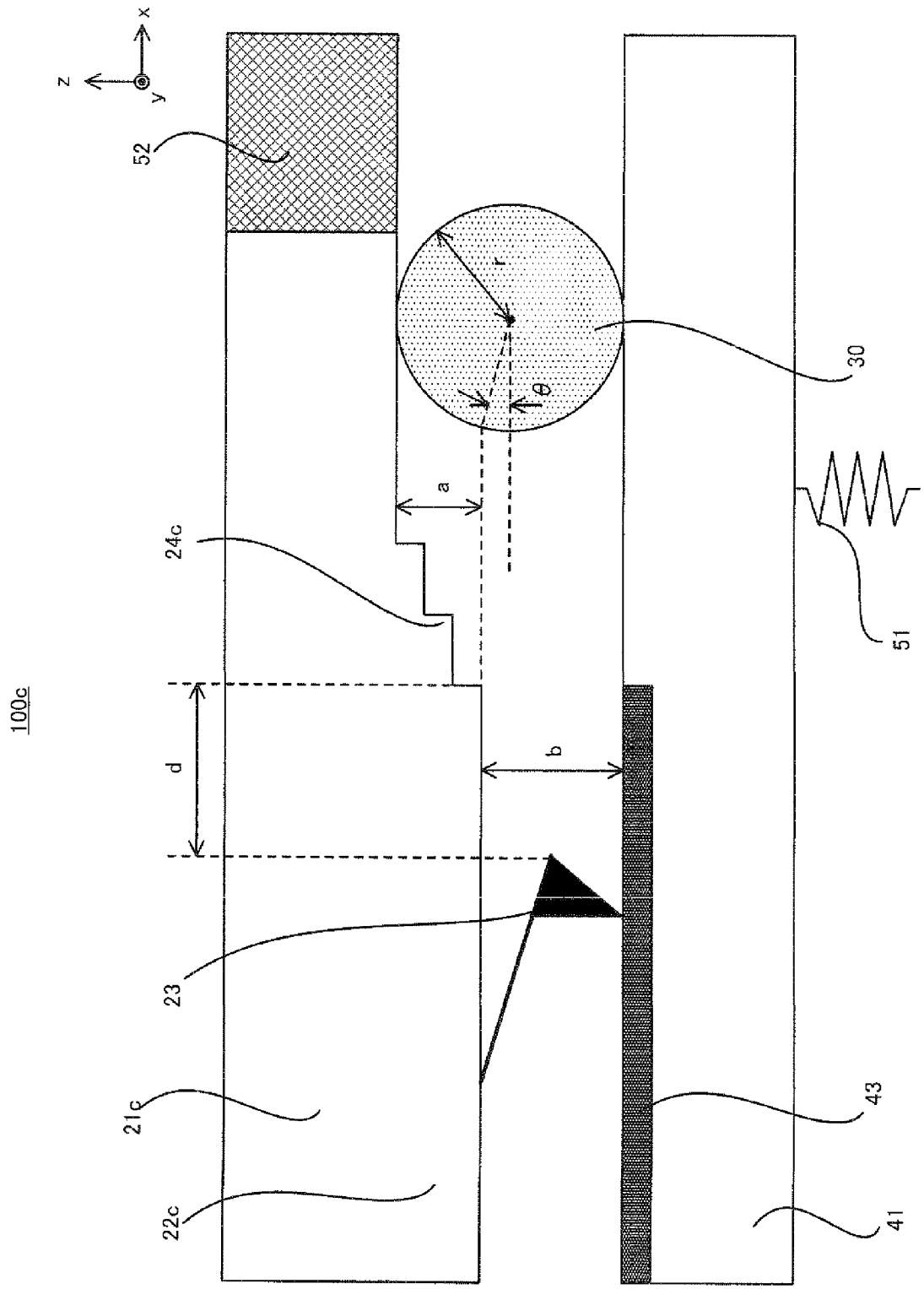

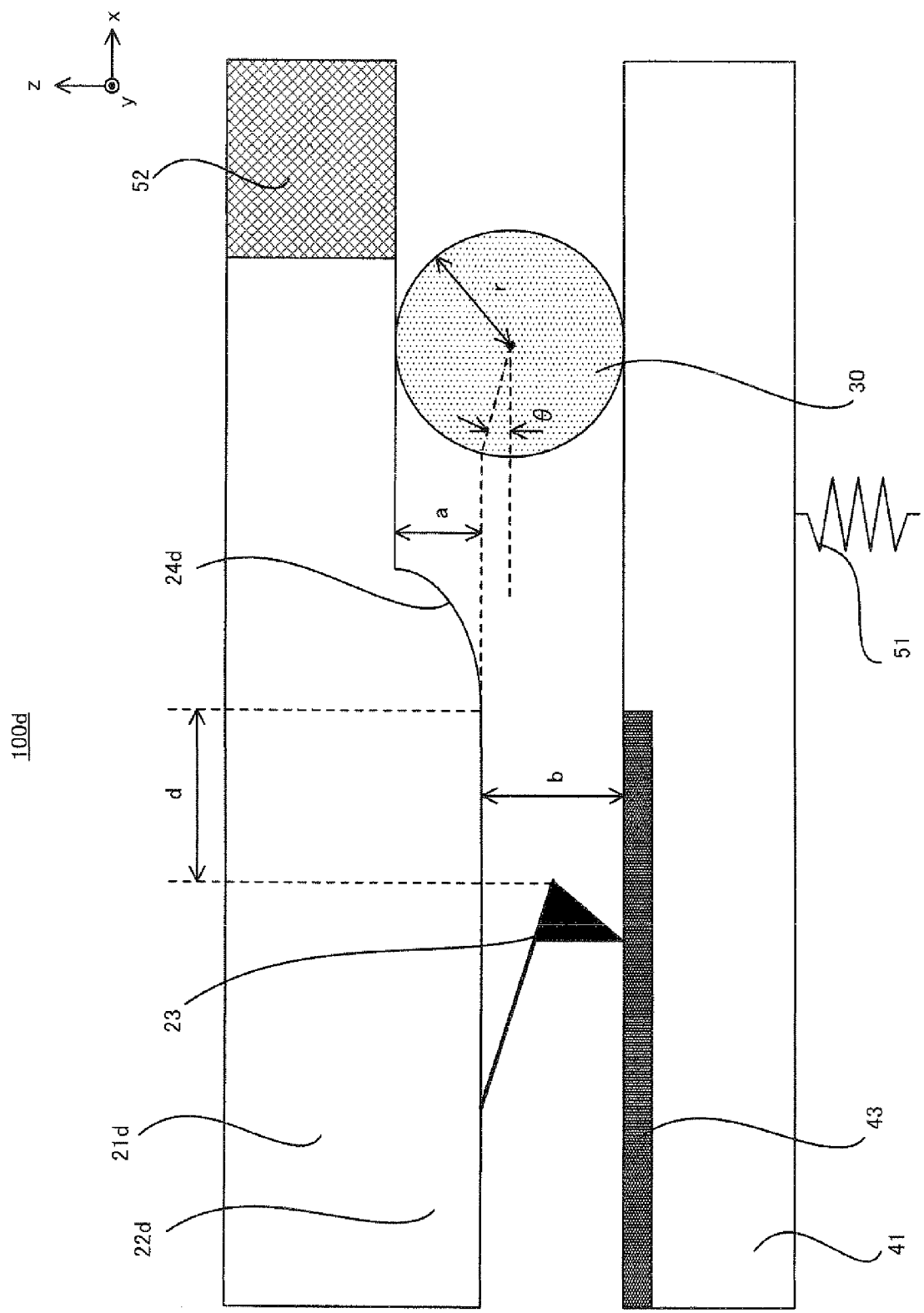
[FIG. 13]

[FIG. 14]
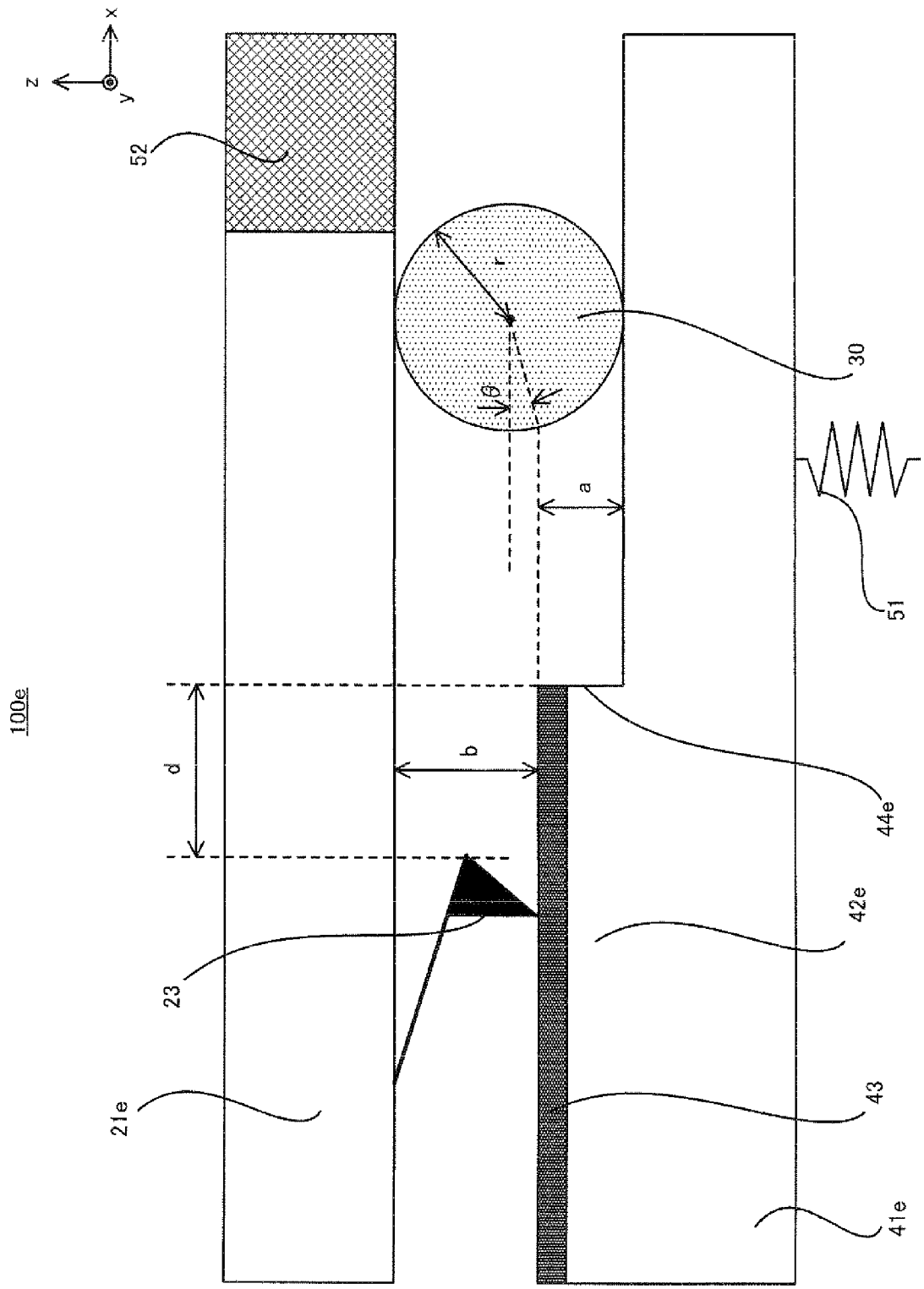

[FIG. 15]
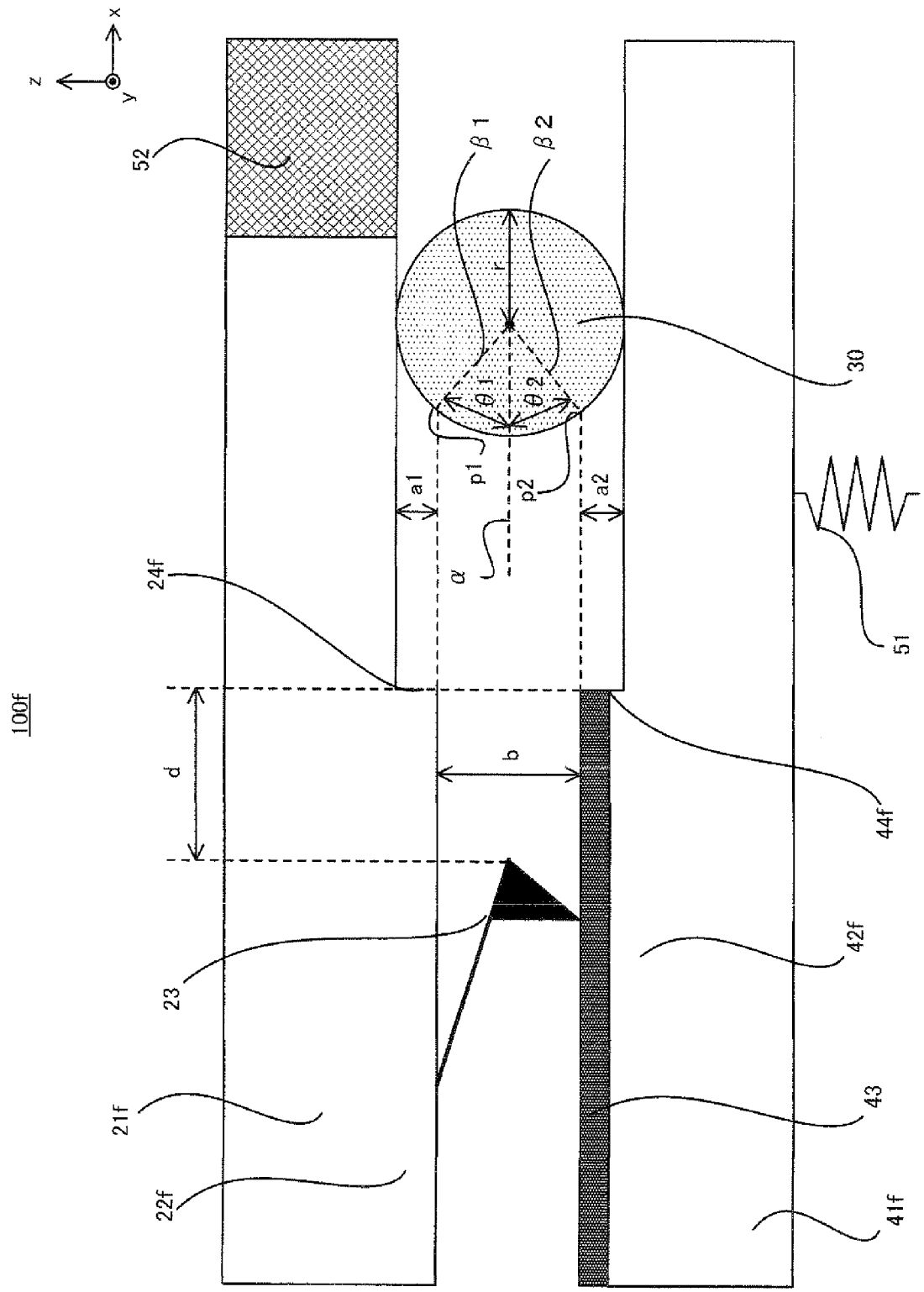

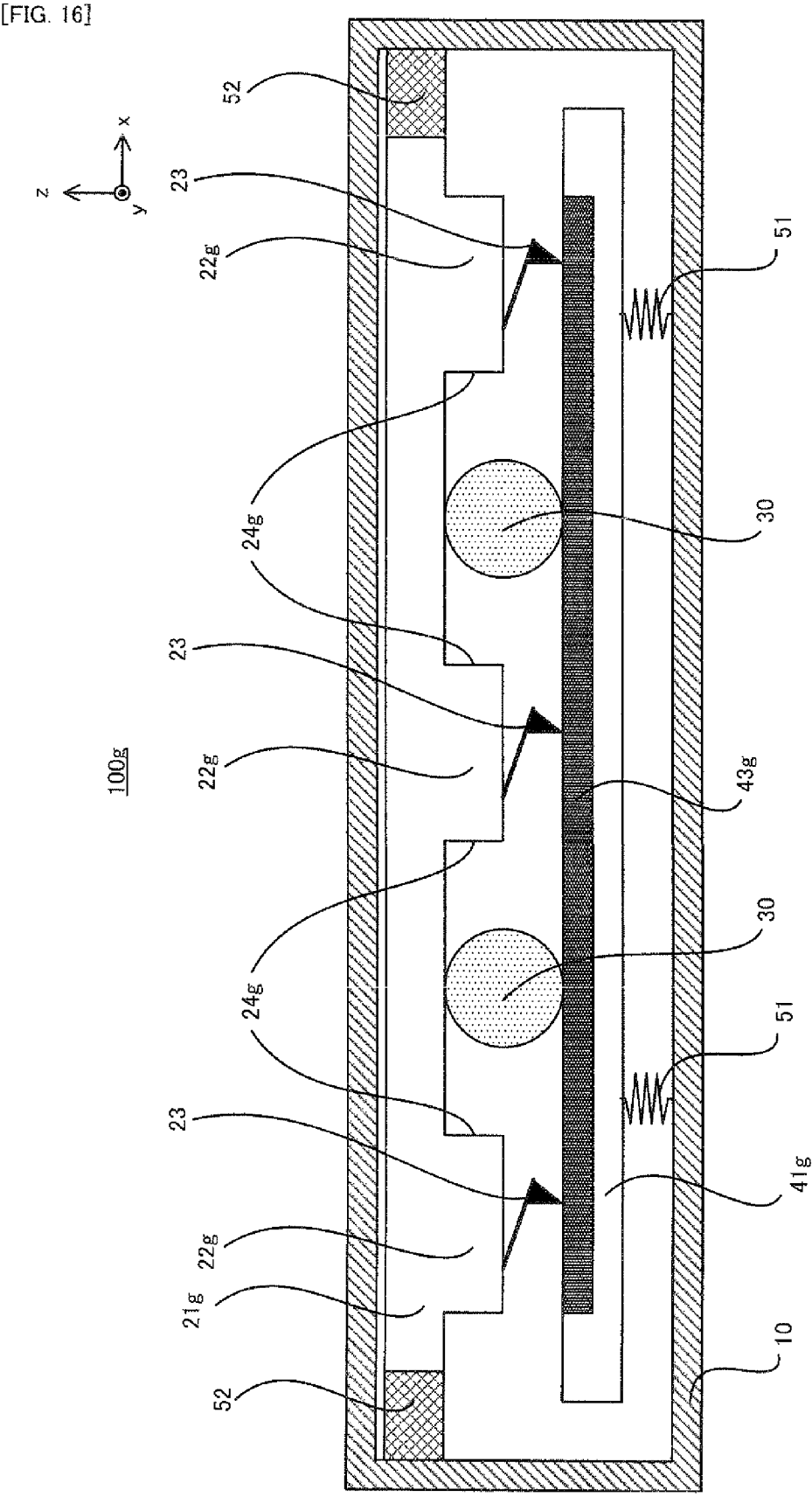
[FIG. 16]

[FIG. 17]
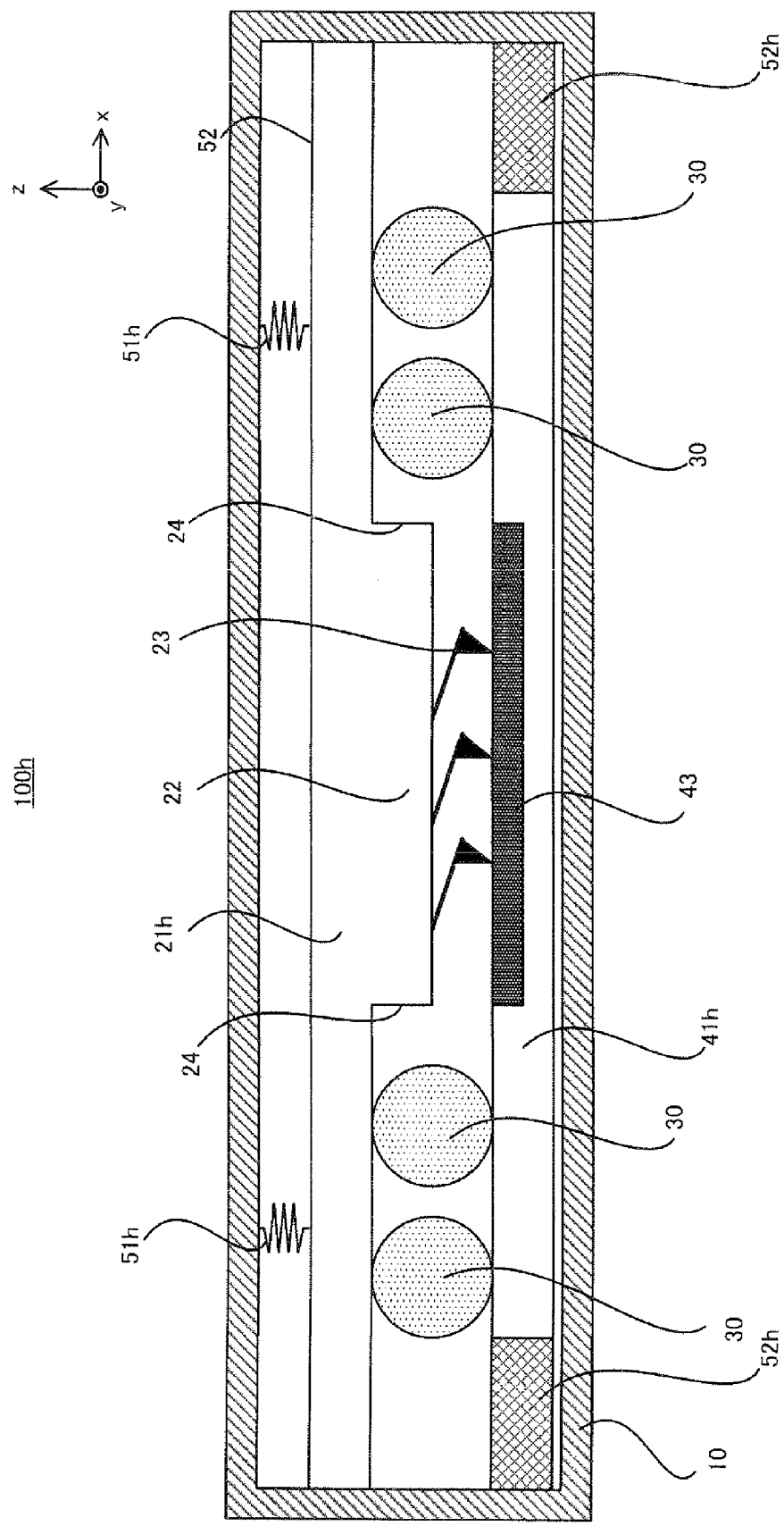

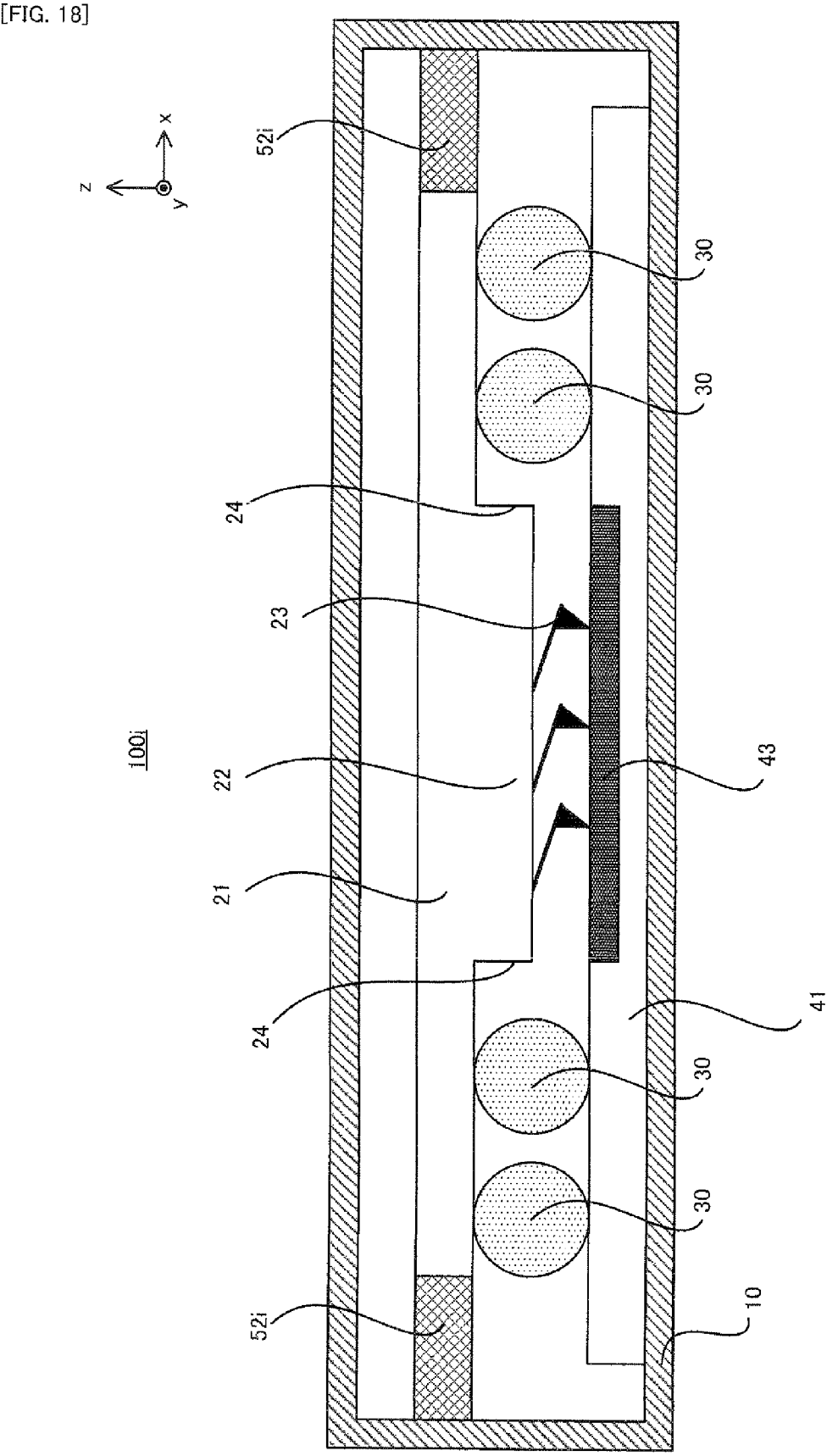

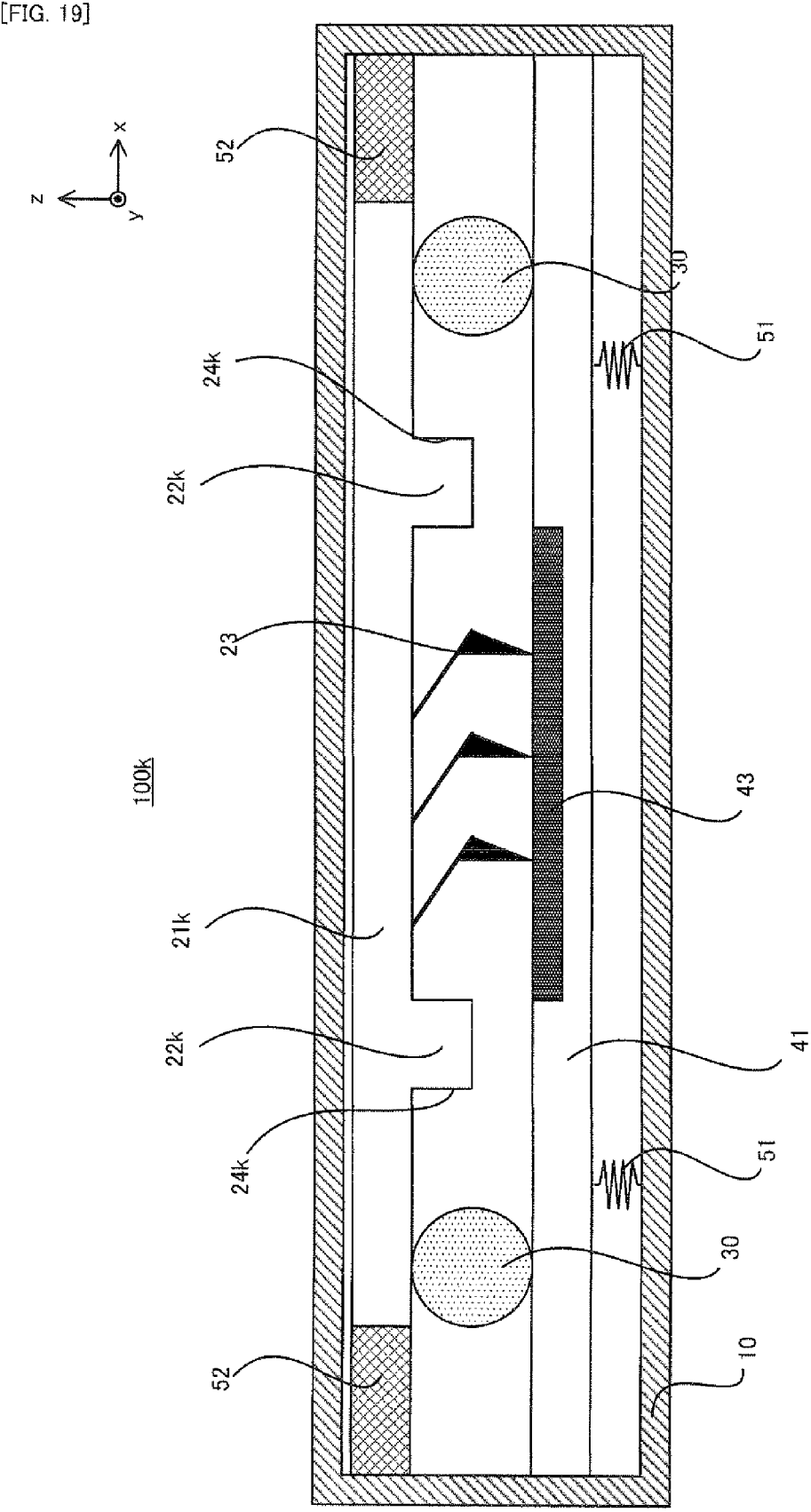
[FIG. 19]

[FIG. 20]
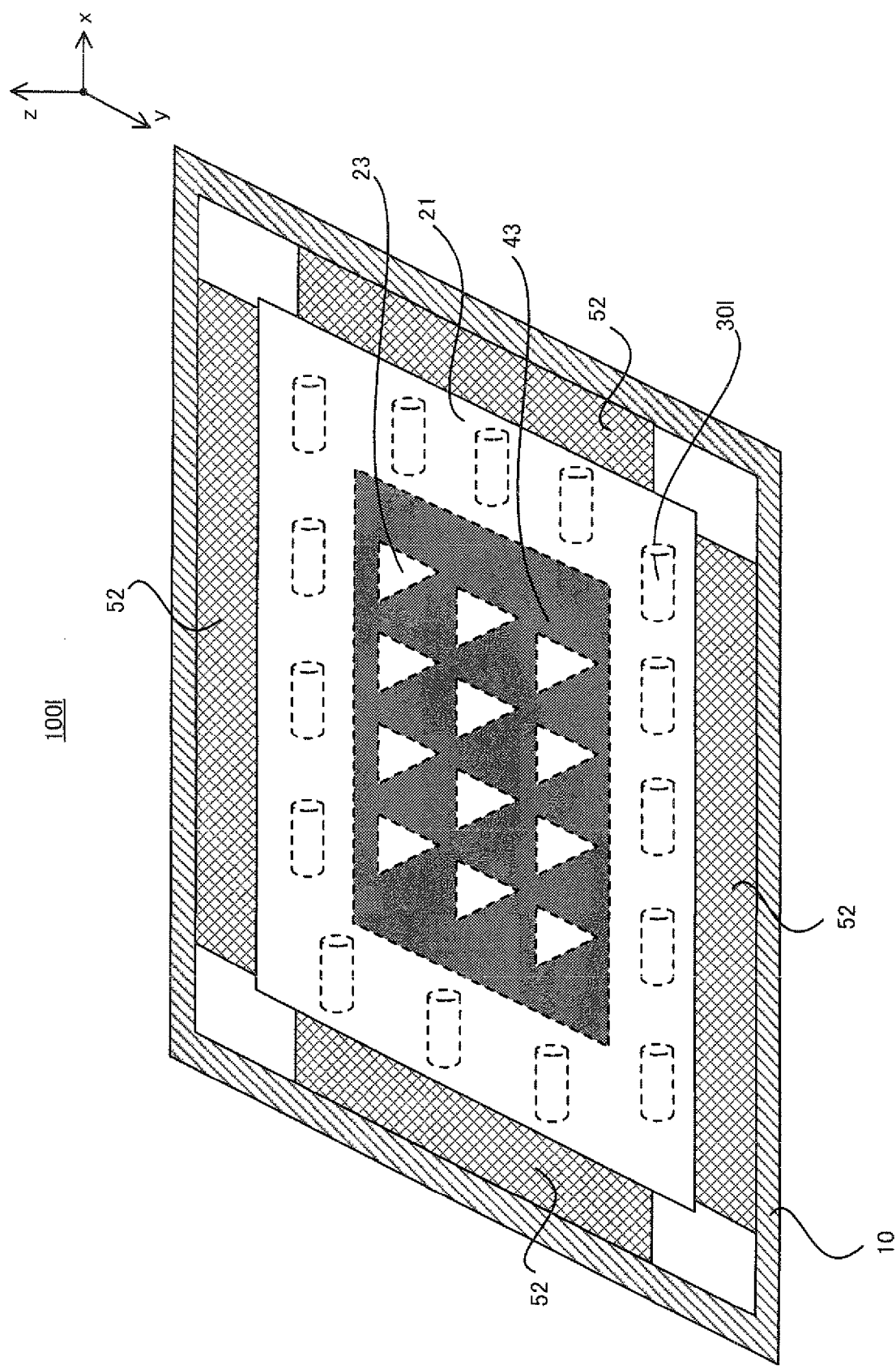

[FIG. 21]
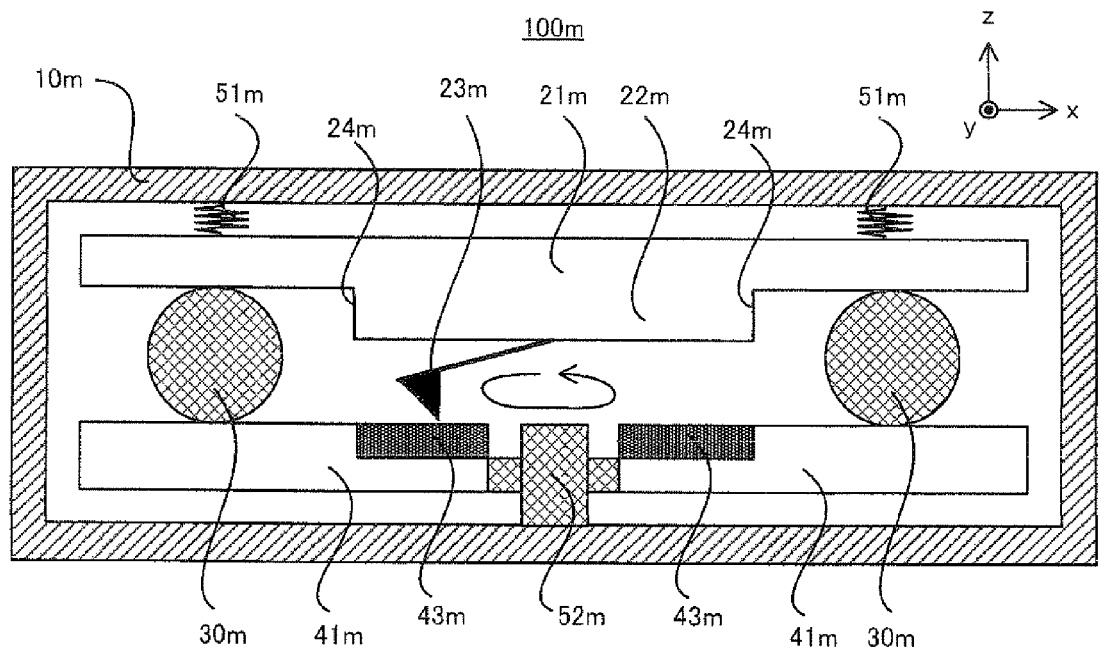
(a)
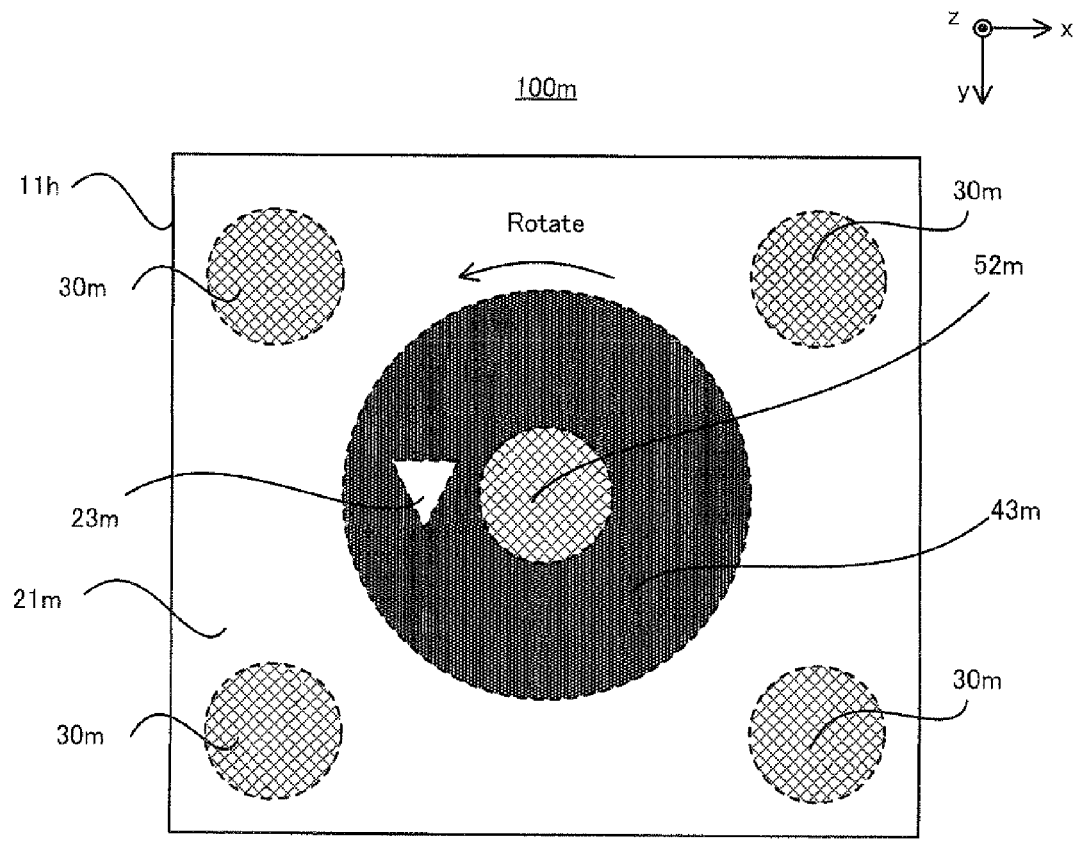
(b)

RECORDING/REPRODUCING APPARATUS

This application is the U.S. national phase of International Application No. PCT/JP2006/319986, filed 5 Oct. 2006, which designated the U.S. the entire contents of which is hereby incorporated by reference.

TECHNICAL FIELD

The present invention relates to a recording/reproducing apparatus for performing at least one of information recording and reproduction while driving a recording medium along a plane, for example.

BACKGROUND ART

For example, development has advanced on a probe memory in which a recording medium is displaced (or driven) along a recording surface of the recording medium with respect to a probe array including a plurality of probes and data is recorded onto the recording medium or the data recorded on the recording medium is reproduced by using each of a plurality of probes. Instead of displacing the recording medium, the probe array may be displaced. In general, in order to bring a recording/reproducing head such as a probe in contact with the recording medium with a certain force, or in order to keep them at a certain distance, a spacer is provided between a substrate provided with the recording/reproducing head and a substrate on which the recording medium is mounted.

Moreover, the use of the spacer is not limited to the aforementioned probe memory. For example, as disclosed in a patent document 1, a spherical spacer is provided between one pair of electrode substrates for applying a voltage to a liquid crystal. Moreover, a patent document 2 discloses an example in which particulates are contained in an adhesive layer between a plurality of substrates which constitute an optical recording medium.

Patent document 1: Japanese Patent Application Laying Open NO. 2002-49041
Patent document 2: Japanese Patent Application Laying Open NO. 2001-195784

DISCLOSURE OF INVENTION

Subject to be Solved by the Invention

However, in the aforementioned technologies in the patent documents, since the electrode substrates or layers which face each other through the spacer are fixed, the technologies cannot be applied to the probe memory provided with the recording medium driven for the probe array. This problem applies not only to the probe memory but also to the general recording/reproducing apparatus for recording or reproducing information on the driven recording medium.

In order to solve the aforementioned problems, it is therefore an object of the present invention to provide a recording/reproducing apparatus which can stably record or reproduce information while maintaining that a recording/reproducing head such as a probe is in contact with the recording medium with a certain force or while keeping them at a certain distance.

Means for Solving the Object

The above object of the present invention can be achieved by a recording/reproducing apparatus, according to claim 1, provided with: a first substrate on which a recording medium is mounted; and a second substrate which faces the first substrate and to which a recording/reproducing head, which performs at least one of information recording and information reproduction on the recording/reproducing medium and protrudes toward the recording medium, is fixed, wherein one of the first substrate and the second substrate is relatively displaced in a predetermined direction substantially parallel to the other of the first substrate and the second substrate, with respect to the other of the first substrate and the second substrate, a particulate is placed in a gap between the first substrate and the second substrate, (i) the particulate is capable of being displaced with displacement of at least one of the first substrate and the second substrate, (ii) the particulate has a substantially circular cross section in a direction that the one of the first substrate and the second substrate is displaced when the one of said first substrate and said second substrate is displaced.

The operation and other advantages of the present invention will become more apparent from the following embodiments.

BRIEF DESCRIPTION OF DRAWINGS

FIG. 1 is a cross sectional view conceptually showing the structure of a recording/reproducing apparatus in a first example.

FIG. 2 is a semi-penetrating view or inside view conceptually showing the structure of the recording/reproducing apparatus in the first example.

FIG. 3 is an enlarged cross sectional view in which a surrounding portion of a stopper is enlarged in the recording/reproducing apparatus in the first example.

FIG. 4 is an enlarged cross sectional view in which the surrounding portion of the stopper is enlarged in the recording/reproducing apparatus in the first example in a first status.

FIG. 5 is an enlarged cross sectional view in which the surrounding portion of the stopper is enlarged in the recording/reproducing apparatus in the first example in a second status.

FIG. 6 is an enlarged cross sectional view in which the surrounding portion of the stopper is enlarged in the recording/reproducing apparatus in the first example in a third status.

FIG. 7 is an enlarged cross sectional view in which the surrounding portion of the stopper is enlarged in the recording/reproducing apparatus in the first example in a fourth status.

FIG. 8 is one graph referred to in determining the radius of a particulate in the recording/reproducing apparatus in the first example.

FIG. 9 is another graph referred to in determining the radius of a particulate in the recording/reproducing apparatus in the first example.

FIG. 10 is a cross sectional view conceptually showing the structure of a recording/reproducing apparatus in a second example.

FIG. 11 is a cross sectional view conceptually showing the structure of a recording/reproducing apparatus in a third example.

FIG. 12 is a cross sectional view conceptually showing the structure of a recording/reproducing apparatus in a fourth example.

FIG. 13 is a cross sectional view conceptually showing the structure of a recording/reproducing apparatus in a fifth example.

FIG. 14 is a cross sectional view conceptually showing the structure of a recording/reproducing apparatus in a sixth example.

FIG. 15 is a cross sectional view conceptually showing the structure of a recording/reproducing apparatus in a seventh example.

FIG. 16 is a cross sectional view conceptually showing the structure of a recording/reproducing apparatus in an eighth example.

FIG. 17 is a cross sectional view conceptually showing the structure of a recording/reproducing apparatus in a ninth example.

FIG. 18 is a cross sectional view conceptually showing the structure of a recording/reproducing apparatus in a tenth example.

FIG. 19 is a cross sectional view conceptually showing the structure of a recording/reproducing apparatus in an eleventh example.

FIG. 20 is a cross sectional view conceptually showing the structure of a recording/reproducing apparatus in a twelfth example.

FIG. 21 is a cross sectional view conceptually showing the structure of a recording/reproducing apparatus in a thirteenth example.

DESCRIPTION OF REFERENCE CODES 10 case
21 upper substrate
22 uneven portion
23 probe
24 stopper
30 particulate
41 lower substrate
42 uneven portion
43 recording medium
44 stopper
51 spring
52 actuator
100 recording/reproducing apparatus

BEST MODE FOR CARRYING OUT THE INVENTION

Hereinafter, as the best mode for carrying out the present invention, an explanation will be given on embodiments of the recording/reproducing apparatus of the present invention.

An embodiment of the recording/reproducing apparatus of the present invention is a recording/reproducing apparatus provided with: a first substrate on which a recording medium is mounted; and a second substrate which faces the first substrate and to which a recording/reproducing head, which performs at least one of information recording and information reproduction on the recording/reproducing medium and protrudes toward the recording medium, is fixed, wherein one of the first substrate and the second substrate is relatively displaced in a predetermined direction substantially parallel to the other of the first substrate and the second substrate, with respect to the other of the first substrate and the second substrate, a particulate is placed in a gap between the first substrate and the second substrate, (i) the particulate is capable of being displaced with displacement of at least one of the first substrate and the second substrate, (ii) the particulate has a substantially circular cross section in a direction that the one of the first substrate and the second substrate is displaced when the one of said first substrate and said second substrate is displaced.

According to the embodiment of the recording/reproducing apparatus of the present invention, by using the recording/reproducing head, which is directly fixed on the second substrate or which is indirectly fixed on the second substrate through a structure provided on the second substrate, at least one of the information recording and the information reproduction is performed on the recording medium mounted on the first substrate. The first substrate and the second substrate are disposed to face each other at substantially parallel surfaces. Moreover, the first substrate can be displaced in a direction substantially parallel to the second substrate. Alternatively, the second substrate can be displaced in a direction substantially parallel to the first substrate. In other words, the first substrate can be displaced relatively to the second substrate.

In the embodiment, in particular, the particulate is provided between the first substrate and the second substrate. The particulate can be displaced with the displacement of the first substrate or the second substrate. Specifically, the particulate is not firmly fixed to at least one of the first substrate and the second substrate, but is disposed between the first substrate and the second substrate such that it can arbitrarily move. Moreover, the particulate has the substantially circular cross section in the direction that one of the first substrate and the second substrate is displaced (i.e. the substantially circular cross section in the displacement direction). In other words, the particulate in the embodiment is not limited to literally what has a substantially spherical shape, but also broadly includes what has a substantially circular cross section in the direction that one of the first substrate and the second substrate is displaced. Moreover, the expression "substantially circular" in the embodiment broadly includes a shape that can be substantially regarded as a circle even with slight distortion and a shape that can be substantially regarded as a circle regardless of its polygonal shape, in addition to literally indicating the circular shape. Incidentally, the particulates may be provided uniformly or discretely, in an entire area between the first substrate and the second substrate, or in one portion between the first substrate and the second substrate.

By this, it is possible to preferably displace one of the first substrate and the second substrate, in the direction substantially parallel to the other of the first substrate and the second substrate. More specifically, if one of the first substrate and the second substrate is displaced, the particulate is displaced, with it rolling with the displacement of the one of the first substrate and the second substrate, due to the substantially circular cross section of the particulate. Therefore, there is not particularly adverse influence on the displacement of the one of the first substrate and the second substrate. Thus, it is possible to preferably displace one of the first substrate and the second substrate, in the direction substantially parallel to the other of the first substrate and the second substrate.

In addition, by adjusting the size (e.g. radius) of the particulate, the distance between the first substrate and the second substrate (in other words, the distance between the recording/reproducing head and the recording medium, or a force when the recording/reproducing head comes into contact with the recording medium) can be maintained in a preferable status. As a result, it is possible to preferably perform at least one of the information recording and the information reproduction. More specifically, if at least one of the information recording and the information reproduction is performed when the recording/reproducing head is in contact with the recording medium, it is possible to preferably perform at least one of the information recording and the information reproduction by adjusting the size of the particulate such that the recording/reproducing head is in contact with the recording medium with a force that does not damage them. On the other hand, if at least one of the information recording and the information reproduction is performed while the recording/reproducing head is not in contact with the recording medium, it is possible to preferably perform at least one of the information recording and the information reproduction by adjusting the size of the particulate so as to realize such a distance between the recording/reproducing head and the recording medium that allows at least one of the information recording and the information reproduction.

In addition, even if an unintended external force is applied to the first substrate in a direction approaching the second substrate, a force applied to the recording/reproducing head or the recording medium due to the external force can be dispersed to the particulates because the particulates are provided between the first substrate and the second substrate. Alternatively, it is possible to preferably prevent an unintended contact between the first substrate and the second substrate (in other words, between the recording/reproducing head and the recording medium). The same is true for a case where an unintended external force is applied to the second substrate in a direction approaching the first substrate. This is extremely useful in practice because it is possible to prevent at least one of the recording/reproducing head and the recording medium from being damaged.

As explained above, according to the recording/reproducing apparatus in the embodiment, it is possible to stably perform the information recording and the information reproduction while maintaining that the recording/reproducing head is in contact with the recording medium with a certain force or while keeping them at a certain distance.

In one aspect of the embodiment of the recording/reproducing apparatus of the present invention, the particulate is not placed in a gap between the recording medium and the recording/reproducing head, out of the gap between the first substrate and the second substrate.

According to this aspect, it is possible to preferably prevent such a disadvantage that the particulate interrupts at least one of the information recording and the information reproduction performed by the recording/reproducing head on the recording medium.

In another aspect of the embodiment of the recording/reproducing apparatus of the present invention, the first substrate is provided with an uneven portion which protrudes toward the second substrate and whose at least one portion is a stopper for the particulate.

According to this aspect, by bringing the particulate in contact with (or crashing into or colliding with) the uneven portion as the stopper (i.e. a bulge portion or a projecting portion protruding on the first substrate), it is possible to preferably prevent such a disadvantage that the particulate comes into contact with the recording/reproducing head located on the rear side of the stopper (specifically, on the rear side viewed from the particulate). Moreover, it is also possible to preferably prevent such a disadvantage that the particulate outflows to the exterior. In other words, it is possible to preferably limit or control the displacement range of the particulate.

Incidentally, in order to preferably prevent each of the disadvantage that the particulate comes into contact with the recording/reproducing head and the disadvantage that particulate outflows to the exterior, the uneven portion as the stopper is preferably provided so as to limit or control each of a range of the displacement of the particulate to the recording/reproducing head side and a range of the displacement of the particulate to the side opposite to the recording/reproducing head (i.e. to the exterior side of the recording/reproducing apparatus).

In an aspect of the recording/reproducing apparatus in which the first substrate is provided with the uneven portion as described above, at least one portion of an uneven shape of the stopper may be a curve.

By virtue of such construction, it is possible to preferably limit or control the displacement range of the particulate, and it is also possible to ease the impact of the contact between the particulate and the stopper. In other words, it is possible to appropriately prevent the particulate from coming into contact with the corner of the stopper at a point, so that it is possible to ease the impact by the contact between the particulate and the stopper.

In particular, if at least one portion of the uneven shape of the stopper is set to engage with the external form of the particulate, the particulate comes into contact with the stopper at a surface, so that it is possible to further ease the impact. This can prevent the particulate or the uneven portion from being damaged.

In an aspect of the recording/reproducing apparatus in which the first substrate is provided with the uneven portion as described above, at least one portion of an uneven shape of the stopper may be step-shaped.

By virtue of such construction, the particulate is in contact with each of the unevenness in the step shape, so that the particulate comes into contact with the stopper at a plurality of points. Thus, the impact of the contact between the particulate and the stopper is dispersed to each of the unevenness in the step shape. By this, it is possible to appropriately prevent the particulate from coming into contact with the corner of the stopper at a point, so that it is possible to ease the impact by the contact between the particulate and the stopper.

Incidentally, if the unevenness in the step shape is provided, the uneven shape of the stopper may be set such that a line obtained by connecting the contact portions of the uneven shape which contact with the particulate matches the external form of the particulate. By this, it is possible to more certainly bring the particulate in contact with the stopper at more points, and it is possible to further ease the impact. By this, it is possible to prevent the particulate or the uneven portion from being damaged.

In an aspect of the recording/reproducing apparatus in which the first substrate is provided with the uneven portion as described above, the uneven portion may be unified with the first substrate.

By virtue of such construction, it is possible to form the uneven portion, relatively easily.

In an aspect of the recording/reproducing apparatus in which the first substrate is provided with the uneven portion as described above, the recording medium may be mounted on the uneven portion.

By virtue of such construction, it is possible to preferably prevent such a disadvantage that the particulate comes into contact with the recording reproducing head, and it is also possible to preferably perform at least one of the information recording and the information reproduction.

In an aspect of the recording/reproducing apparatus in which the first substrate is provided with the uneven portion as described above, a minimum radius of the particulate may be determined such that the particulate is not in contact with an edge portion of the recording/reproducing head on the uneven side even if the particulate enters in the uneven portion at most.

By virtue of such construction, it is possible to preferably prevent such a disadvantage that the particulate comes into contact with the recording/reproducing head.

In an aspect of the recording/reproducing apparatus in which the minimum radius of the particulate is determined as described above, if (a) a size of the stopper protruding from the first substrate is a, (b) a distance between the stopper and the second substrate is b, (c) a distance between the edge portion of the recording/reproducing head and the stopper is d, and (iv) an angle made by a line which passes through a center of the particulate and which is parallel to the first substrate or the second substrate and a line connecting a point at which the stopper is in contact with the particulate and the center of the particulate is θ, a minimum radius r of the particulate may satisfy b/2<r if b<d/(1−cos θ) and satisfy b/2<r<d/(1−cos θ) or b<r if b>d/(1−cos θ).

By virtue of such construction, it is possible to preferably prevent such a disadvantage that the particulate comes into contact with the recording/reproducing head, as detailed later using the drawings.

In an aspect of the recording/reproducing apparatus in which the minimum radius of the particulate is determined as described above, the recording/reproducing apparatus may be provided with at least three particulates, and the radius of each of the at least three particulates may be greater than or equal to the minimum radius r.

By virtue of such construction, since at least three particulates have the size of the minimum radius r or more, it is possible to keep the certain distance between the second substrate and the first substrate having the planar shape, and it is also possible to preferably receive the aforementioned various effects.

In another aspect of the embodiment of the recording/reproducing apparatus of the present invention, the second substrate is provided with an uneven portion which protrudes toward the first substrate and whose at least one portion is a stopper for the particulate.

According to this aspect, by bringing the particulate in contact with (or crashing into or colliding with) the uneven portion as the stopper (i.e. a bulge portion or a projecting portion protruding on the second substrate), it is possible to preferably prevent such a disadvantage that the particulate comes into contact with the recording/reproducing head located on the rear side of the stopper (specifically, on the rear side viewed from the particulate). Moreover, it is also possible to preferably prevent such a disadvantage that the particulate outflows to the exterior. In other words, it is possible to preferably limit or control the displacement range of the particulate. Therefore, it is possible to preferably receive the same various effects as those received by the uneven portion provided for the first substrate.

In an aspect of the recording/reproducing apparatus in which the second substrate is provided with the uneven portion as described above, at least one portion of an uneven shape of the stopper may be a curve.

By virtue of such construction, it is possible to preferably limit or control the displacement range of the particulate, and it is also possible to ease the impact of the contact between the particulate and the stopper. In other words, it is possible to appropriately prevent the particulate from coming into contact with the corner of the stopper at a point, so that it is possible to ease the impact by the contact between the particulate and the stopper.

In an aspect of the recording/reproducing apparatus in which the second substrate is provided with the uneven portion as described above, at least one portion of an uneven shape of the stopper may be step-shaped By virtue of such construction, the particulate is in contact with each of the unevenness in the step shape, so that the particulate comes into contact with the stopper at a plurality of points. Thus, the impact of the contact between the particulate and the stopper is dispersed to each of the unevenness in the step shape. By this, it is possible to appropriately prevent the particulate from coming into contact with the corner of the stopper at a point, so that it is possible to ease the impact by the contact between the particulate and the stopper.

In an aspect of the recording/reproducing apparatus in which the second substrate is provided with the uneven portion as described above, the uneven portion may be unified with the second substrate.

By virtue of such construction, it is possible to form the uneven portion, relatively easily.

In an aspect of the recording/reproducing apparatus in which the second substrate is provided with the uneven portion as described above, the recording/reproducing head may be fixed on the uneven portion.

By virtue of such construction, it is possible to preferably prevent such a disadvantage that the particulate comes into contact with the recording medium, and it is also possible to preferably prevent such a disadvantage that the particulate comes into contact with the recording/reproducing head located at the position facing the recording medium.

In an aspect of the recording/reproducing apparatus in which the second substrate is provided with the uneven portion as described above, the uneven portion may be placed in a gap between the recording/reproducing head and the particulate.

By virtue of such construction, it is possible to preferably prevent such a disadvantage that the particulate comes into contact with the recording medium, and it is also possible to preferably prevent such a disadvantage that the particulate comes into contact with the recording/reproducing head located at the position facing the recording medium.

In an aspect of the recording/reproducing apparatus in which the second substrate is provided with the uneven portion as described above, a minimum radius of the particulate may be determined such that the particulate is not in contact with an edge portion of the recording/reproducing head on the uneven side even if the particulate enters in the uneven portion at most.

By virtue of such construction, it is possible to preferably prevent such a disadvantage that the particulate comes into contact with the recording/reproducing head.

In an aspect of the recording/reproducing apparatus in which the minimum radius of the particulate is determined as described above, if (a) a size of the stopper protruding from the second substrate is a, (b) a distance between the stopper and the first substrate is b, (c) a distance between the edge portion of the recording/reproducing head and the stopper is d, and (iv) an angle made by a line which passes through a center of the particulate and which is parallel to the first substrate or the second substrate and a line connecting a point at which the stopper is in contact with the particulate and the center of the particulate is θ, a minimum radius r of the particulate may satisfy b/2<r if b<d/(1−cos θ) and satisfy b/2<r<d/(1−cos θ) or b<r if b>d/(1−cos θ).

By virtue of such construction, it is possible to preferably prevent such a disadvantage that the particulate comes into contact with the recording/reproducing head, as detailed later using the drawings.

In an aspect of the recording/reproducing apparatus in which the minimum radius of the particulate is determined as described above, the recording/reproducing apparatus may be provided with at least three particulates, and the radius of each of the at least three particulates may be greater than or equal to the minimum radius r.

By virtue of such construction, since at least three particulates have the magnitude of the minimum radius r or more, it is possible to keep the certain distance between the second substrate and the first substrate having the planar shape, and it is also possible to preferably receive the aforementioned various effects.

In another aspect of the embodiment of the recording/reproducing apparatus of the present invention, the recording/reproducing head performs at least one of the information recording and the information reproduction by that at least a tip of the recording/reproducing head comes into contact with the recording medium, and a lower limit of a diameter of the particulate is a distance between the first substrate and the second substrate when at least one of the recording medium and the recording/reproducing head is damaged due to a contact force of the recording medium and the recording/reproducing head.

According to this aspect, by virtue of the particulate in which the lower limit of the diameter is determined in the above manner, it is possible to prevent such a disadvantage that at least one of the recording/reproducing head and the recording medium is damaged. If the particulate less than the lower limit is provided, the recording medium and the recording/reproducing head are likely brought in contact with a strong force until at least one of the recording medium and the recording/reproducing head is damaged. In the embodiment, however, since the particulate which is greater than or equal the lower limit is provided, the first substrate or the second substrate comes into contact with the particulate before at least one of the recording medium and the recording/reproducing head is damaged, so that the recording medium and the recording/reproducing head are no longer pressed with a strong force. In other words, the recording medium and the recording/reproducing head are no longer brought in contact with a strong force until at least one of the recording medium and the recording/reproducing head is damaged.

In another aspect of the embodiment of the recording/reproducing apparatus of the present invention, the recording/reproducing head performs at least one of the information recording and the information reproduction by that at least a tip of the recording/reproducing head comes into contact with the recording medium, and an upper limit of a diameter of the particulate is a distance between the first substrate and the second substrate when the recording medium and the recording/reproducing head come into contact until at least one of the information recording and the information reproduction can be performed.

According to this aspect, by virtue of the particulate in which the upper limit of the diameter is determined in the above manner, it is possible to perform at least one of the information recording and the information reproduction. If the particulate greater than the upper limit is provided, the first substrate and the second substrate are brought in contact with the particulate before the recording medium and the recording/reproducing head come into contact, with a force necessary to perform at least one of the information recording and the information reproduction. This hardly allows the recording medium and the recording/reproducing head to come into contact, with the force necessary for the information recording and the information reproduction. In the embodiment, however, since the particulate which is less than or equal to the upper limit is provided, it is possible to bring the recording medium and the recording/reproducing head in contact, with the force necessary for the information recording and the information reproduction.

In another aspect of the embodiment of the recording/reproducing apparatus of the present invention, the recording/reproducing head performs at least one of the information recording and the information reproduction without coming into contact with the recording medium, and an upper limit of a diameter of the particulate is a distance between the first substrate and the second substrate when at least one of the information recording and the information reproduction can be performed and when the recording medium is farthest from the recording/reproducing head.

According to this aspect, by virtue of the particulate in which the upper limit of the diameter is determined in the above manner, it is possible to perform at least one of the information recording and the information reproduction. If the particulate greater than the upper limit is provided, it is hardly possible to bring the first substrate and the second substrate close to each other until at least one of the information recording and the information reproduction can be performed. In other words, the interval between the recording medium and the recording/reproducing head when the particulate comes into contact with each of the first substrate and the second substrate is beyond the interval that allows at least one of the information recording and the information reproduction. In the embodiment, however, since the particulate which is less than or equal to the upper limit is provided, it is possible to bring the recording medium and the recording/reproducing close to each other until at least one of the information recording and the information reproduction can be performed.

In another aspect of the embodiment of the recording/reproducing apparatus of the present invention, the recording/reproducing head performs at least one of the information recording and the information reproduction without coming into contact with the recording medium, and a lower limit of a diameter of the particulate is a distance between the first substrate and the second substrate when at least one of the information recording and the information reproduction can be performed and when the recording medium is closest to the recording/reproducing head.

According to this aspect, by virtue of the particulate in which the lower limit of the diameter is determined in the above manner, it is possible to perform at least one of the information recording and the information reproduction. If the particulate less than the lower limit is provided, the particulate does not come into contract with at least one of the first substrate and the second substrate if the recording medium and the recording/reproducing head are brought far away from each other until at least one of the information recording and the information reproduction can be performed. In other words, if the recording medium and the recording/reproducing head are brought close to each other until the particulate comes into contact with each of the first substrate and the second substrate, the interval between the recording medium and the recording/reproducing head falls below the interval that allows at least one of the information recording and the information reproduction. This may halve the aforementioned various effects. In the embodiment, however, since the particulate which is less than or equal to the upper limit is provided, it is possible to receive the aforementioned various effects since the particulate is in contact with the first substrate and the second substrate even if the recording medium and the recording/reproducing head are brought far away from each other until at least one of the information recording and the information reproduction can be performed. In other words, it is possible to prevent such a disadvantage that the interval between the recording medium and the recording/reproducing head falls below the interval that allows at least one of the information recording and the information reproduction. As a result, it is possible to receive the aforementioned various effects.

In another aspect of the embodiment of the recording/reproducing apparatus of the present invention, the particulate is placed in a gap between the first substrate and a portion of the recording medium at which the recording medium does not face the recording/reproducing head.

According to this aspect, the particulate may be also provided on the recording medium; however, the particulate is preferably provided not to adversely influence at least one of the information recording and the information reproduction.

The operation and other advantages of the present invention will become more apparent from the following examples.

As explained above, according to the embodiment of the recording/reproducing apparatus of the present invention, it is provided with the first substrate on which the recording medium is mounted, and the second substrate to which the recording/reproducing head is fixed, and the particulate is provided between the first substrate and the second substrate. Therefore, it is possible to stably perform the information recording and the information reproduction while maintaining that the recording/reproducing head is in contact with the recording medium with a certain force or while keeping them at a certain distance.

EXAMPLES

Hereinafter, examples of the present invention will be explained on the basis of the drawings.

(1) First Example

Firstly, with reference to FIG. 1 and FIG. 2, a first example of the recording/reproducing apparatus of the present invention will be explained. FIG. 1 is a cross sectional view conceptually showing the structure of the recording/reproducing apparatus in the first example. FIG. 2 is a semi-penetrating view or inside view (which is not a perspective view) conceptually showing the structure of the recording/reproducing apparatus in the first example.

As shown in FIG. 1 and FIG. 2, a recording/reproducing apparatus 1 in the first example is provided with a case 10 having an upper substrate 21 which constitutes one specific example of the "second substrate" of the present invention; and a lower substrate 41 which constitutes one specific example of the "first substrate" of the present invention. The case 10 is, for example, on the order or centimeters (or millimeters, micrometers, or nanometers). Moreover, the upper substrate 21 and the lower substrate 41 have such a positional relation that they are substantially parallel to each other. That is, each of the upper substrate 21 and the lower substrate 41 is disposed along a xy plane.

The upper substrate 21 is provided with an uneven portion 22 in which one portion of the upper substrate 21 protrudes from another portion. The edge portions of the uneven portion 22 are stopper 24 for particulates 30 described later. Moreover, the uneven portion 22 of the upper substrate 21 is provided with a plurality of probes 23, which constitute one specific example of the "recording/reproducing head" of the present invention. The plurality of probes 23 have sharp tips and apply voltages from the tips to a recording medium 43 disposed at a predetermined position of the upper substrate 41, to thereby perform data recording and reproduction on the recording medium 43.

For example, in case of the recording/reproducing apparatus 100 using a SNDM (Scanning Nonlinear Dielectric Microscopy) principle, data indicated by the polarization directions of a ferroelectric substance is recorded by applying an electric field that is beyond the coercive electric field of the ferroelectric substance from at least one of the tips of the plurality of probes 23 to the recording medium 43 formed of the ferroelectric substance. On the other hand, in the reproduction, by applying an alternating current electric field to the ferroelectric substance and by detecting a difference in capacitance Cs in a certain micro domain of the ferroelectric substance at that time or a difference in the change in the capacitance Cs, the data recorded as the polarization directions of the ferroelectric substance is read and reproduced.

Of course, it may be not only the recording/reproducing apparatus using the SNDM principle but also recording/reproducing apparatuses using various methods.

Moreover, the upper substrate 21 is connected to the case 10 through actuators 52. The lower substrate 41 is connected to the case 10 through springs 51. The springs 51 apply a force in a z-axis direction to the lower substrate 41 (specifically, a force pressing the lower substrate 41 to the upper substrate 21). In other words, the springs 51 support the lower substrate 41 in the z-axis direction. Moreover, the actuators 52 use various drive methods, such as electrostatic drive, electromagnetic drive, and mechanical drive, to displace the upper substrate 21 in an x-axis direction and y-axis direction in FIG. 1. In other words, in the example, a plane drive method is adopted in which the upper substrate 21 (in other words, the plurality of probes 23) is displaced on the xy plane.

In the first example, in particular, a plurality of substantially spherical particulates 30 are provided in a portion between the first substrate 21 and the second substrate 41 in which the plurality of probes 23 and the recording medium 32 are not disposed. Each of the plurality of particulates 30 is, for example, a bead sphere, such as resin. Moreover, the plurality of particulates 30 may be provided, uniformly or discretely, in the portion between the first substrate 21 and the second substrate 41 in which the plurality of probes 23 and the recording medium 32 are not disposed. Moreover, each of the plurality of particulates 30 is displaced in accordance with the displacement in a direction along the xy plane of the upper substrate 21. For example, if the upper substrate is displaced in the positive direction of the x axis, each of the plurality of particulates 30 is displaced in the positive direction of the x axis while rolling in accordance with the displacement.

As described above, since the plurality of substantially spherical particulates 30 are provided in the portion between the first substrate 21 and the second substrate 41 in which the plurality of probes 23 and the recording medium 32 are not disposed, it is possible to preferably displace the plurality of probes 23 (in other words, the upper substrate 21 provided with the plurality of probes 23) along a direction substantially parallel (in other words, along the xy plane) to the recording medium 43 (in other words, the lower substrate 41 on which the recording medium 43 is mounted). More specifically, if the upper substrate 21 provided with the plurality of probes 23 is displaced, the particulates 30 are displaced with them rolling with the displacement of the upper substrate 21 provided with the plurality of probes 23, due to the substantially circular cross section of the particulate 30. Therefore, the presence of the particulate 30 does not particularly adversely influence the displacement of the upper substrate 21 provided with the probes 23. Thus, it is possible to preferably displace the plurality of probes 23 along the direction substantially parallel to the recording medium 43.

In addition, by adjusting the size (specifically, radius) of the particulate 30, it is possible to keep the distance between the upper substrate 21 and the lower substrate 41, generally constant, almost constant, or always constant. In other words, it is possible to maintain that the upper substrate 21 and the lower substrate 41 are substantially parallel. Thus, if the data is recorded and reproduced in the condition that the plurality of probes 23 are in contact with the recording medium 43, the plurality of probes 23 can be displaced with respect to the recording medium 43 while a force when the plurality of probes 23 are in contact with the recording medium 43 is kept generally constant, almost constant, or always constant. Alternatively, if the data is recorded and reproduced in the condition that the plurality of probes 23 are not in contact with the recording medium 43, the plurality of probes 23 can be displaced with respect to the recording medium 43 while the distance between the plurality of probes 23 and the recording medium 43 is kept generally constant, almost constant, or always constant.

In addition, even if an unintended external force is applied to the upper substrate 21 in a direction approaching the lower substrate 41, a force applied from the plurality of probes 23 to the recording medium 43 or a force applied from the recording medium 43 to the plurality of probes 23 due to the external force can be dispersed to the particulates 30 because the particulates 30 are provided between the upper substrate 21 and the lower substrate 41. Alternatively, it is possible to preferably prevent an unintended contact between the plurality of probes 23 and the recording medium 43. The same is true for a case where an unintended external force is applied to the lower substrate 41 in a direction approaching the upper substrate 21. This is extremely useful in practice because it is possible to prevent the plurality of probes 23 and the recording medium 43 from being damaged.

Moreover, the stoppers 24 can preferably prevent the particulates 30 from entering in the side of the plurality of probes 23. By this, it is possible to preferably perform the data recording and reproduction without any adverse influence by the particulates 30, while preferably receiving the various effects by the particulates 30 described above.

Here, the size (specifically, radius) of each of the plurality of particulates 30 is preferably determined in view of the following elements. Hereinafter, the element for determining the radius of each of the plurality of particulates 30 will be explained with reference to FIG. 3 to FIG. 9. FIG. 3 is an enlarged cross sectional view in which a surrounding portion of a stopper is enlarged in the recording/reproducing apparatus in the first example. FIG. 4 is an enlarged cross sectional view in which the surrounding portion of the stopper is enlarged in the recording/reproducing apparatus in the first example in a first status. FIG. 5 is an enlarged cross sectional view in which the surrounding portion of the stopper is enlarged in the recording/reproducing apparatus in the first example in a second status. FIG. 6 is an enlarged cross sectional view in which the surrounding portion of the stopper is enlarged in the recording/reproducing apparatus in the first example in a third status. FIG. 7 is an enlarged cross sectional view in which the surrounding portion of the stopper is enlarged in the recording/reproducing apparatus in the first example in a fourth status. FIG. 8 is one graph referred to in determining the radius of a particulate in the recording/reproducing apparatus in the first example. FIG. 9 is another graph referred to in determining the radius of a particulate in the recording/reproducing apparatus in the first example.

Firstly, an explanation will be given on conditions for the radius of the particulate 30, determined from a viewpoint of prevention of the disadvantage that the particulate 30 comes into contact with the probe 23.

As shown in FIG. 3, the size of the stoppers 24 protruding from the upper substrate 21 (i.e. the height in the z direction of the stoppers 24) is set to be a. Moreover, the distance between the stoppers 24 and the lower substrate 41 is set to be b. Moreover, the distance between the edge (more specifically, the edge on the particulate 30 side) of the probe 23 fixed on the outermost side of the plurality of probes 23 (i.e. the probe 23 brought closest to the particulate 30) and the stopper 24 (more specifically, the edge on the probe 23 side of the stopper 24) is set to be d. Moreover, an angle made by a line α and a line β is set to be θ, wherein the line a passes through the center of the particulate 30 and is parallel to the upper substrate 21 and the lower substrate 41, and the line β is obtained by connecting the center of the particulate 30 and a point p at which the stopper 24 is in contact with the particulate 30. Furthermore, the radius of the particulate 30 is set to be r.

Here, as shown in FIG. 4, if $r \leq b/2$, the particulate 30 is displaced to a portion in which the plurality of probes 23 are disposed, without coming into contact (i.e. without colliding) with the stopper 24. This leads to the damage of the plurality of probes 23, so it is not preferable. Thus, the radius of the particulate requires $r > b/2$.

Then, as shown in FIG. 5, if $r \geq b$, even one portion of the particulate 30 does not enter the inside of the stopper 24 (i.e. the portion in which the plurality of probes 23 are fixed). Therefore, the radius of the particulate 30 is preferably $r \geq b$.

Then, consideration is given to a case where one portion of the particulate 30 enters the inside the stopper 24 (i.e. $b/2 < r < b$), as shown in FIG. 6. The size t of the one portion of the particulate 30 which enters the inside of the stopper 24 is $t = r - r \times \cos θ = r(1 - \cos θ)$. Therefore, in order for the particulate 30 not to come into contact with the probe 23, it requires $t = r(1 - \cos θ) < d$. This requires $r < d/(1 - \cos θ)$.

At this time, the size relation between b explained in FIG. 5 and $d/(1 - \cos θ)$ needs to be considered. If $b \leq d/(1 - \cos θ)$, the disadvantage that the particulate 30 comes into contact with the probe 23 is prevented in the case where $b/2 < r$ is satisfied with respect to the radius r of the particulate 30. On the other hand, if $b > d/(1 - \cos θ)$, the disadvantage that the particulate 30 comes into contact with the probe 23 is prevented in the case where $b/2 < r < d/(1 - \cos θ)$ or $b < r$ is satisfied.

In conclusion, as for the conditions for the radius r of the particulate 30 defined from the viewpoint of prevention of the disadvantage that the particulate 30 comes into contact with the probe 23, $b/2 < r$ if $b \leq d/(1 - \cos θ)$, and $b < r$ if $b > d/(1 - \cos θ)$.

On the other hand, depending on the arrangement of the plurality of probes 23, a case is also considered where the tip portion of the probe 23 fixed on the outermost side of the plurality of probes 23 (hereinafter, referred to the "external probe" as occasion demands) enters under the particulate 30, as shown in FIG. 7. This case will be considered. Here, it is assumed that an angle made by the external probe 23 and the upper substrate 21 is a, that the distance between the tip of the external probe 23 and the edge of the particulate 30 on the closer side to the external probe 23 is D, and that the external probe 23 is expressed by an equation of $y = Ax + B$ (wherein the origin of xy coordinates shall be the center O of the particulate 30).

At this time, the distance m between the center O of the particulate 30 and the external probe 23 is expressed by $m = |B|/((1 + A^2)^{1/2})$, from a formula for the distance between a point and a line. Therefore, in order for the particulate 30 not to come into contact with the external probe 23, it is necessary that m>r.

Here, since A denotes the slope of the external probe 23 with respect to the upper substrate 23, A=tan α. Moreover, B is a y-intercept of an equation y=Ax+B which indicates the external probe 30 on the xy plane with its origin at the center O of the particulate 30. From FIG. 7, it can be seen that B=r+c. From FIG. 7, it can be seen that c=(r−D)×tan α.

By substituting A and B into m, the aforementioned equation of m>r becomes |r+(r−D)×tan α|/((1+(tan² α)$^{1/2}$)>r. By this, from the viewpoint of prevention of the disadvantage that the particulate 30 comes into contact with the external probe 23, the radius r of the particulate 30 needs to satisfy r>D×(sin α/(1+sin α+cos α).

Next, an explanation will be given on the radius r of the particulate 30 determined from the positional relation between the plurality of probes 23 and the recording medium 43 in realizing the preferable data recording and reproduction.

Firstly, an explanation will be given on a case where the data recording and reproduction are performed by the plurality of probes 23 coming into contact with the recording medium 43.

As shown in FIG. 8, the radius r of the particulate 30 can be determined from a graph in which a force when the plurality of probes 23 come into contact with the recoding medium 43 (i.e. a stress applied to the plurality of probes 23 or the recoding medium 43) is plotted on a vertical axis and in which a force in the z direction applied to the lower substrate 41 from the springs 51 (refer to FIG. 1) is plotted on a horizontal axis.

If a force is started to be applied to the lower substrate 41 from the condition that the plurality of probes 23 are not in contact with the recording medium 43, the plurality of probes 23 come into contact with the recording medium 43 at a stage of applying a force F11. Then, as the force applied to the upper substrate 21 is increased, the force when the plurality of probes 23 come into contact with the recording medium 43 is also increased.

Here, at the time point that the force when plurality of probes 23 come into contact with the recording medium 43 is greater than or equal to a force F21, which is the smallest contact force required for the data recording and reproduction operations, the data recording and reproduction operations can be performed.

Here, if the radius r of the particulate 30 is excessively large, the upper substrate 21 likely comes into contact with the particulates 30 before the smallest contact force F21 is obtained which is required for the data recording and reproduction operations. This is not preferable as the data recording and reproduction operations cannot be performed. Therefore, in order to obtain the smallest contact force F21, it is preferable to determine the radius r of the particulate 30. Specifically, ½ of a distance d1 is preferably determined to be the upper limit of the radius r of the particulate 30, wherein the distance d1 is the distance between the upper substrate 21 (specifically, the portion in which the uneven portion 22 is not formed of the upper substrate 21) and the lower substrate 41 at the time point that the force when the plurality of probes 23 come into contact with the recording medium 43 is the smallest contact force F21.

Then, at the time point that the force applied to the lower substrate 41 is F12, the upper substrate 21 comes into contact with the particulates 30. Thereafter, even if the force applied to the lower substrate 41 is increased, the force is applied to the particulates 30, so that the force when the plurality of probes 23 come into contact with the recording medium 43 is not increased.

On the other hand, if the particulates 30 are not provided between the upper substrate 21 and the lower substrate 41, as the force applied to the lower substrate 41 is increased, the force when the plurality of probes 23 come into contact with the recording medium 43 is increased. As a result, if the force when the plurality of probes 23 come into contact with the recording medium 43 is greater than or equal to a contact force F22 strong enough to damage the probes 23 or the recording medium 43, the probes 23 or the recording medium 43 are damaged. In the example, since the particulates 30 are provided between the upper substrate 21 and the lower substrate 41, the damage can be considered to be prevented. If, however, the radius r of the particulate 30 is excessively small, the force when the plurality of probes 23 come into contact with the recording medium 43 is likely greater than or equal to the contact force F22 before the upper substrate 21 comes into contact with the particulates 30. Therefore, the radius r of the particulate 30 is preferably determined such that the upper substrate 21 comes into contact with the particulates 30 before the force when the plurality of probes 23 come into contact with the recording medium 43 is greater than or equal to the contact force F22. Specifically, ½ of a distance d2 is preferably determined to be the lower limit (wherein, d2 is out of range) of the radius r of the particulate 30, wherein the distance d2 is the distance between the upper substrate 21 (specifically, the portion in which the uneven portion 22 is not formed of the upper substrate 21) and the lower substrate 41 at the time point that the force when the plurality of probes 23 come into contact with the recording medium 43 is the contact force F22.

Next, an explanation will be given on a case where the data recording and reproduction are performed without the plurality of probes 23 coming into contact with the recording medium 43.

As shown in FIG. 9, the radius r of the particulate 30 can be determined from a graph in which an interval between the plurality of probes 23 and the recording medium 43 is plotted on a vertical axis and in which a force in the z direction applied to the lower substrate 41 from the springs 51 (refer to FIG. 1) is plotted on a horizontal axis.

If a force is started to be applied to the lower substrate 41 from the condition that the plurality of probes 23 are farthest from the recording medium 43, the interval between the plurality of probes 23 and the recording medium 43 gradually becomes less. Here, if the force applied to the lower substrate 41 is greater than or equal to F31, the interval between the plurality of probes 23 and the recording medium 43 is less than or equal to D2, which is the largest interval required for the data recording and reproduction operations. At this time point, the data recording and reproduction operations can be performed.

Here, if the radius r of the particulate 30 is excessively large, the upper substrate 21 likely comes into contact with the particulates 30 before the interval between the plurality of probes 23 and the recording medium 43 is less than or equal to the interval D2. This is not preferable as the data recording and reproduction operations cannot be performed. Therefore, it is preferable to determine the radius r of the particulate 30 such that the interval between the plurality of probes 23 and the recording medium 43 is less than or equal to the interval D2. Specifically, ½ of a distance d3 is preferably determined to be the upper limit of the radius r of the particulate 30, wherein the distance d3 is the distance between the upper substrate 21 (specifically, the portion in which the uneven portion 22 is not formed of the upper substrate 21) and the lower substrate 41 at the time point that the interval between the plurality of probes 23 and the recording medium 43 is less than or equal to the interval D2.

Then, at the time point that the force applied to the lower substrate 41 is F32, the upper substrate 21 comes into contact with the particulates 30. Thereafter, even if the force applied to the lower substrate 41 is increased, the force is applied to the particulates 30, so that the interval between the plurality of probes 23 and the recording medium 43 is not changed.

On the other hand, if the particulates 30 are not provided between the upper substrate 21 and the lower substrate 41, as the force applied to the upper substrate 21 is increased, the interval between the plurality of probes 23 and the recording medium 43 is reduced. As a result, at the time point that the interval between the plurality of probes 23 and the recording medium 43 falls below D1, which is the smallest interval required for the data recording and reproduction operations, the data recording and reproduction operations cannot be performed. Even if the particulates 30 are provided between the upper substrate 21 and the lower substrate 41, if the radius r of the particulate 30 is excessively small, the interval between the plurality of probes 23 and the recording medium 43 likely falls below D1, which is the smallest interval required for the data recording and reproduction operations, before the upper substrate 21 comes into contact with the particulates 30. Therefore, the radius r of the particulate 30 is preferably determined such that the upper substrate 21 comes into contact with the particulates 30 before the interval between the plurality of probes 23 and the recording medium 43 falls below D1. Specifically, ½ of a distance d4 is preferably determined to be the lower limit of the radius r of the particulate 30, wherein the distance d4 is the distance between the upper substrate 21 (specifically, the portion in which the uneven portion 22 is not formed of the upper substrate 21) and the lower substrate 41 at the time point that the interval between the plurality of probes 23 and the recording medium 43 is the interval D1.

Incidentally, in the first example, the stoppers 24 are formed in order for the particulate 30 not to come into contact with the plurality of probes 23. In other words, the stoppers 24 are formed to limit or control a displacement range in the inner direction of the particulate 30 (i.e. to the side of the plurality of probes 23). However, the stoppers may be formed to limit or control the outflow of the particulate 30 to the exterior of the recording/reproducing apparatus 1. In other words, the stoppers may be formed to limit or control a displacement range in the outer direction of the particulate 30 (i.e. toward the exterior of the recording/reproducing apparatus 1).

(2) Second Example

Next, with reference to FIG. 10, a second example of the recording/reproducing apparatus of the present invention will be explained. FIG. 10 is a cross sectional view conceptually showing the structure of the recording/reproducing apparatus in the second example. Incidentally, the same constituents of the recording/reproducing apparatus 100 in the first example carry the same reference numerals, and their detailed explanations are omitted.

As shown in FIG. 10, in a recording/reproducing apparatus 100a in the second example, a recording medium 43a is mounted over an entire lower substrate 41a. Even in such construction, the aforementioned various effects can be received. Moreover, the recording medium 43a is not necessarily mounted over the entire lower substrate 41a. Even if the particulates 30 are disposed on the recording medium 43a, the aforementioned various effects can be received.

Incidentally, in the second example, if the distance between the stoppers 24 and the surface of the recording medium 43 is set to b, it is possible to apply the explanation on the radius r of the particulate 30 without any change, which is explained with reference to FIG. 3 to FIG. 7. Moreover, if the distance between the upper substrate 21 (specifically, the portion in which the uneven portion 22 is not formed of the upper substrate 21) and the surface of the recording medium 43 is set to d1 to d4, it is possible to apply the explanation on the radius r of the particulate 30 without any change, which is explained with reference to FIG. 8 and FIG. 9.

(3) Third Example

Next, with reference to FIG. 11, a third example of the recording/reproducing apparatus of the present invention will be explained. FIG. 11 is a cross sectional view conceptually showing the structure of the recording/reproducing apparatus in the third example. Incidentally, the same constituents of the recording/reproducing apparatus 100 in the first example carry the same reference numerals, and their detailed explanations are omitted.

As shown in FIG. 11, in a recording/reproducing apparatus 100b in the third example, a stopper 24b has a slope shape. Even in such construction, the aforementioned various effects can be received. In addition, the stopper 24 hardly or does not come into contact with the particulate 30 at its angled portion, so that it is possible to relatively ease the impact of the contact between the particulate 30 and the stopper 24b.

(4) Fourth Example

Next, with reference to FIG. 12, a fourth example of the recording/reproducing apparatus of the present invention will be explained. FIG. 12 is a cross sectional view conceptually showing the structure of the recording/reproducing apparatus in the fourth example. Incidentally, the same constituents of the recording/reproducing apparatus 100 in the first example carry the same reference numerals, and their detailed explanations are omitted.

As shown in FIG. 12, in a recording/reproducing apparatus 100c in the fourth example, a stopper 24c has a step or stair shape. Even in such construction, the aforementioned various effects can be received. In addition, the stopper 24 can be brought in contact with the particulate 30 at a plurality of points (specifically, at the angled portions of respective steps in the step shape), so that it is possible to disperse the impact of the contact between the particulate 30 and the stopper 24b.

Incidentally, a line obtained by connecting the angled portions of the respective steps in the step shape may match the external form of the particulate 30. By virtue of such construction, it is possible to more certainly bring the particulate 30 in contact with the stopper 24c at the plurality of points (specifically, at the angled portions of respective steps in the step shape), so that it is possible to further disperse the impact of the contact between the particulate 30 and the stopper 24b.

(5) Fifth Example

Next, with reference to FIG. 13, a fifth example of the recording/reproducing apparatus of the present invention will be explained. FIG. 13 is a cross sectional view conceptually showing the structure of the recording/reproducing apparatus in the fifth example. Incidentally, the same constituents of the recording/reproducing apparatus 100 in the first example carry the same reference numerals, and their detailed explanations are omitted.

As shown in FIG. 13, in a recording/reproducing apparatus 100*d* in the fifth example, a stopper 24*d* has a curved shape. Even in such construction, the aforementioned various effects can be received. In addition, the stopper 24 hardly or does not come into contact with the particulate 30 at its angled portion, so that it is possible to relatively ease the impact of the contact between the particulate 30 and the stopper 24*d*.

Incidentally, the external form of the stopper 24*d* may engage with that of the particulate 30. By virtue of such construction, the particulate 30 can be brought in contact with the surface of the stopper 24*d*, so that it is possible to further disperse the impact of the contact between the particulate 30 and the stopper 24*b*.

Moreover, the shapes of the stopper 24 explained using FIG. 11 to FIG. 13 are merely one specific example; even if the stopper 24 has other shapes, the aforementioned various effects can be received if it can limit the displacement range of the particulate 30.

(6) Sixth Example

Next, with reference to FIG. 14, a sixth example of the recording/reproducing apparatus of the present invention will be explained. FIG. 14 is a cross sectional view conceptually showing the structure of the recording/reproducing apparatus in the sixth example. Incidentally, the same constituents of the recording/reproducing apparatus 100 in the first example carry the same reference numerals, and their detailed explanations are omitted.

As shown in FIG. 14, in a recording/reproducing apparatus 100*e* in the sixth example, a tower substrate 41*e* is provided with an uneven portion 42*e*. Moreover, the uneven portion of the uneven portion 42*e* constitutes a stopper 44*e*. Even in such construction, the aforementioned various effects can be received, as in the case where the upper surface 21 has the uneven portion 22.

Incidentally, even if the lower substrate 41*e* is provided with the uneven portion 42*e* (and moreover, the stopper 44*e*), the various structures of the uneven portion 22 (and moreover, the stopper 24) provided for the upper substrate 21 can be obviously applied to the uneven portion 42*e* (and moreover, the stopper 44*e*).

Moreover, it is possible to apply the explanation on the radius r of the particulate 30, which is explained with reference to FIG. 3 to FIG. 6, without any change in the following conditions; the magnitude of the stopper 44*e* protruding from the lower substrate 41*e* (i.e. the height in the z direction of the stopper 44*e*) is set to be a, the distance between the stopper 44*e* and the upper substrate 21 is set to be b, and the distance between the stopper 44*e* and the edge portion of the probe 23 fixed on the outermost side of the plurality of probes 23 is set to d.

(7) Seventh Example

Next, with reference to FIG. 15, a seventh example of the recording/reproducing apparatus of the present invention will be explained. FIG. 15 is a cross sectional view conceptually showing the structure of the recording/reproducing apparatus in the seventh example. Incidentally, the same constituents of the recording/reproducing apparatus 100 in the first example carry the same reference numerals, and their detailed explanations are omitted.

As shown in FIG. 15, in a recording/reproducing apparatus 100*f* in the seventh example, an upper substrate 21*f* is provided with an uneven portion 22*f*, and a lower substrate 41*f* is provided with an uneven portion 42*f*. Even if each of the upper substrate 21*f* and the lower substrate 41*f* is provided with the uneven portion, the aforementioned various effects can be received.

Moreover, it is possible to apply the explanation on the radius r of the particulate 30, which is explained with reference to FIG. 3 to FIG. 6, without any change in the following conditions; the magnitude of a stopper 24*f* protruding from the upper substrate 21*f* (i.e. the height in the z direction of the stopper 24*f*) is set to be a1, the magnitude of a stopper 44*f* protruding from the lower substrate 41*f* (i.e. the height in the z direction of the stopper 44*f*) is set to be a2, the distance between the stoppers 24*f* and 44*f* is set to be b, an angle made by a line $\alpha$ and a line $\beta 1$ is set to $\theta 1$, wherein the line $\alpha$ passes through the center of the particulate 30 and is parallel to the upper substrate 21*f* and the lower substrate 41*f*, and the line $\beta 1$ is obtained by connecting the center of the particulate 30 and a point p1 at which the stopper 24*f* is in contact with the particulate 30, and an angle made by the line $\alpha$ and a line $\beta 2$ is set to $\theta 2$, wherein the line $\beta 2$ is obtained by connecting the center of the particulate 30 and a point p1 at which the stopper 44*f* is in contact with the particulate 30.

(8) Eighth Example

Next, with reference to FIG. 16, an eighth example of the recording/reproducing apparatus of the present invention will be explained. FIG. 16 is a cross sectional view conceptually showing the structure of the recording/reproducing apparatus in the eighth example. Incidentally, the same constituents of the recording/reproducing apparatus 100 in the first example carry the same reference numerals, and their detailed explanations are omitted.

As shown in FIG. 16, in a recording/reproducing apparatus 100*g* in the eighth example, the plurality of probes 23 are fixed one-by-one to a plurality of uneven portions 22*g* of an upper substrate 21*g* dispersedly formed. Moreover, the particulate is provided between adjacent two of the plurality of probes 23. Even in such construction, the aforementioned various effects can be received.

(9) Ninth Example

Next, with reference to FIG. 17, a ninth example of the recording/reproducing apparatus of the present invention will be explained. FIG. 17 is a cross sectional view conceptually showing the structure of the recording/reproducing apparatus in the ninth example. Incidentally, the same constituents of the recording/reproducing apparatus 100 in the first example carry the same reference numerals, and their detailed explanations are omitted.

As shown in FIG. 17, in a recording/reproducing apparatus 100*h* in the ninth example, a lower substrate 41*h* is connected to the case 10 through actuators 52*h*. Springs 51*h* apply a force in the z-axis direction with respect to an upper substrate 21*h* (specifically a force pressing the upper substrate 21*h* to the lower substrate 41*h*). In other words, the springs 51*h* support the upper substrate 21*h* in the z-axis direction. Therefore, in the recording/reproducing apparatus 100*h* in the ninth example, instead of the upper substrate 21*h*, the lower substrate 41*h* is displaced along the xy plane. Even in such construction, the aforementioned various effects can be received.

Moreover, even if each of the upper substrate 21h and the lower substrate 41h is constructed to be displaced along the xy plane, the aforementioned various effects can be obviously received.

(10) Tenth Example

Next, with reference to FIG. 18, a tenth example of the recording/reproducing apparatus of the present invention will be explained. FIG. 18 is a cross sectional view conceptually showing the structure of the recording/reproducing apparatus in the tenth example. Incidentally, the same constituents of the recording/reproducing apparatus 100 in the first example carry the same reference numerals, and their detailed explanations are omitted.

As shown in FIG. 18, in a recording/reproducing apparatus 100i in the tenth example, actuators 52i displace the upper substrate 21 in the x-axis direction and the y-axis direction as described above, and the actuators 52i also apply a force in the z-axis direction with respect to the upper substrate 21 (specifically a force pressing the upper substrate 21 to the lower substrate 41). In other words, the actuators 52i have elasticity or a spring property with respect to the z-axis direction. In other words, instead of the springs 51 adjacent to the upper substrate 21 along the z-axis direction, the actuators 52i, which are not adjacent to the upper substrate 21 along the z-axis direction, can apply a force to bring the plurality of probes 23 in contact with or close to the recording medium 43 (specifically, a force along the z-axis direction). Even in such construction, the aforementioned various effects can be received.

(11) Eleventh Example

Next, with reference to FIG. 19, an eleventh example of the recording/reproducing apparatus of the present invention will be explained. FIG. 19 is a cross sectional view conceptually showing the structure of the recording/reproducing apparatus in the eleventh example. Incidentally, the same constituents of the recording/reproducing apparatus 100 in the first example carry the same reference numerals, and their detailed explanations are omitted.

As shown in FIG. 19, in a recording/reproducing apparatus 100k in the eleventh example, uneven portions 22k are formed between the plurality of probes 23 and the particulates 30. In other words, the plurality of probes 23 are disposed in an area surrounded by the uneven portions 22k. Even in such construction, the aforementioned various effects can be received.

(12) Twelfth Example

Next, with reference to FIG. 20, a twelfth example of the recording/reproducing apparatus of the present invention will be explained. FIG. 20 is a cross sectional view conceptually showing the structure of the recording/reproducing apparatus in the twelfth example Incidentally, the same constituents of the recording/reproducing apparatus 100 in the first example carry the same reference numerals, and their detailed explanations are omitted.

As shown in FIG. 20, in a recording/reproducing apparatus 100l in the twelfth example, cylindrical particulates 301 are provided between the upper substrate 21 and the lower substrate 41. In the recording/reproducing apparatus 100l, the upper substrate 21 is displaced in a direction along the y-axis.

As described above, if the upper substrate 21 or the lower substrate 41 is displaced only in the y direction, the aforementioned various effects can be preferably received since the cross section of the cylindrical particulates 301 is circular even if the cylindrical particulates 301 are provided. In other words, the particulate 30 is not necessarily spherical. The aforementioned various effects can be received if the upper substrate 21 or the lower substrate 41 has a circular cross section in the displacement direction at least when the upper substrate 21 or the lower substrate 41 is displaced.

(13) Thirteenth Example

Next, with reference to FIG. 21, a thirteenth example of the recording/reproducing apparatus of the present invention will be explained. FIG. 21 are a cross sectional view and a top view conceptually showing the structure of the recording/reproducing apparatus in the thirteenth example. Incidentally, the same constituents of the recording/reproducing apparatus 100 in the first example carry the same reference numerals, and their detailed explanations are omitted.

As shown in FIG. 21(a) and FIG. 21(b), a recording/reproducing apparatus 100m in the thirteenth example adopts a rotation drive method in which a circular lower substrate 41m is rotated in a direction shown by arrows in FIG. 21(a) and FIG. 21(b) by an actuator 52m including a spindle motor or the like. Incidentally, FIG. 21(b) is a top view when the recording/reproducing apparatus 100m is observed from the upper side of FIG. 21(a). For the recording/reproducing apparatus 100m, for example, an optical disc drive, a hard disk drive, or the like can be listed as one specific example. Even in the recording/reproducing apparatus 100m in the thirteenth example, it is possible to preferably receive the various effects received by the recording/reproducing apparatus 100 in the first example which adopts the aforementioned plane drive method.

Incidentally, even in the recording/reproducing apparatus 100m, obviously, it is possible to receive the various effects received by the recording/reproducing apparatuses 100a to 100l by adopting the constructions in the recording/reproducing apparatus 100a in the second example to the recording/reproducing apparatus 100l in the twelfth example.

The present invention is not limited to the aforementioned example, and various changes may be made, if desired, without departing from the essence or spirit of the invention which can be read from the claims and the entire specification. A recording/reproducing apparatus, which involves such changes, is also intended to be within the technical scope of the present invention.

The invention claimed is:

1. A recording/reproducing apparatus comprising:
   a first substrate on which a recording medium is mounted; and
   a second substrate which faces said first substrate and to which a recording/reproducing head, which performs at least one of information recording and information reproduction on the recording/reproducing medium and protrudes toward the recording medium, is fixed, wherein
   said first substrate and said second substrate are disposed such that one surface of said first substrate faces another surface of said second substrate substantially parallel to each other,
   one of said first substrate and said second substrate is relatively displaced in a predetermined direction substantially parallel to the other of said first substrate and said second substrate, with respect to the other of said first substrate and said second substrate,
   a particulate is placed in a gap between the one surface of said first substrate and the another surface of said second substrate, (i) the particulate is capable of being displaced with displacement of at least one of said first substrate and said second substrate, (ii) the particulate has a substantially circular cross section in a direction that the one of said first substrate and said second substrate is displaced when the one of said first substrate and said second substrate is displaced, said first substrate comprises an uneven portion which protrudes toward said second substrate and whose at least one portion is a stopper for the particulate, and at least one portion of an uneven shape of the stopper is a curve.

2. The recording/reproducing apparatus according to claim 1, wherein the uneven portion is unified with said first substrate.

3. The recording/reproducing apparatus according to claim 1, wherein the recording medium is mounted on the uneven portion.

4. A recording/reproducing apparatus comprising:
a first substrate on which a recording medium is mounted; and
a second substrate which faces said first substrate and to which a recording/reproducing head, which performs at least one of information recording and information reproduction on the recording/reproducing medium and protrudes toward the recording medium is fixed wherein
said first substrate and said second substrate are disposed such that one surface of said first substrate faces another surface of said second substrate substantially parallel to each other,
one of said first substrate and said second substrate is relatively displaced in a predetermined direction substantially parallel to the other of said first substrate and said second substrate, with respect to the other of said first substrate and said second substrate,
a particulate is placed in a gap between the one surface of said first substrate and the another surface of said second substrate, (i) the particulate is capable of being displaced with displacement of at least one of said first substrate and said second substrate, (ii) the particulate has a substantially circular cross section in a direction that the one of said first substrate and said second substrate is displaced when the one of said first substrate and said second substrate is displaced,
said first substrate comprises an uneven portion which protrudes toward said second substrate and whose at least one portion is a stopper for the particulate, and
at least one portion of an uneven shape of the stopper is step-shaped.

5. The recording/reproducing apparatus according to claim 4, wherein the uneven portion is unified with said first substrate.

6. The recording/reproducing apparatus according to claim 4, wherein the recording medium is mounted on the uneven portion.

7. A recording/reproducing apparatus comprising:
a first substrate on which a recording medium is mounted; and
a second substrate which faces said first substrate and to which a recording/reproducing head, which performs at least one of information recording and information reproduction on the recording/reproducing medium and protrudes toward the recording medium, is fixed, wherein said first substrate and said second substrate are disposed such that one surface of said first substrate faces another surface of said second substrate substantially parallel to each other,
one of said first substrate and said second substrate is relatively displaced in a predetermined direction substantially parallel to the other of said first substrate and said second substrate, with respect to the other of said first substrate and said second substrate,
a particulate is placed in a gap between the one surface of said first substrate and the another surface of said second substrate, (i) the particulate is capable of being displaced with displacement of at least one of said first substrate and said second substrate, (ii) the particulate has a substantially circular cross section in a direction that the one of said first substrate and said second substrate is displaced when the one of said first substrate and said second substrate is displaced,
said first substrate comprises an uneven portion which protrudes toward said second substrate and whose at least one portion is a stopper for the particulate,
a minimum radius of the particulate is determined such that the particulate is not in contact with an edge portion of the recording/reproducing head on the uneven side even if the particulate enters in the uneven portion at most, and
if (i) a size of the stopper protruding from said first substrate is a, (ii) a distance between the stopper and said second substrate is b, (iii) a distance between the edge portion of the recording/reproducing head and the stopper is d, and (iv) an angle made by a line which passes through a center of the particulate and which is parallel to said first substrate or said second substrate and a line connecting a point at which the stopper is in contact with the particulate and the center of the particulate is $\theta$, a minimum radius r of the particulate satisfies $b/2 < r$ if $b < d/(1-\cos \theta)$ and satisfies $b/2 < r < d/(1-\cos \theta)$ or $b < r$ if $b > d/(1-\cos \theta)$.

8. The recording/reproducing apparatus according to claim 7, wherein
said recording/reproducing apparatus comprises at least three particulates, and
the radius of each of the at least three particulates is greater than or equal to the minimum radius r.

9. A recording/reproducing apparatus comprising:
a first substrate on which a recording medium is mounted; and
a second substrate which faces said first substrate and to which a recording/reproducing head is fixed, the recording/reproducing head performing at least one of information recording and information reproduction on the recording/reproducing medium and protruding toward the recording medium, is fixed, wherein
said first substrate and said second substrate are disposed such that one surface of said first substrate faces another surface of said second substrate substantially parallel to each other,
one of said first substrate and said second substrate is relatively displaced in a predetermined direction substantially parallel to the other of said first substrate and said second substrate, with respect to the other of said first substrate and said second substrate,
a particulate is placed in a gap between the one surface of said first substrate and the another surface of said second substrate, (i) the particulate is capable of being displaced with displacement of at least one of said first substrate and said second substrate, (ii) the particulate has a substantially circular cross section in a direction that the one of said first substrate and said second substrate is displaced when the one of said first substrate and said second substrate is displaced, said second substrate comprises an uneven portion which protrudes toward said first substrate and whose at least one portion is a stopper for the particulate, a minimum radius of the particulate is determined such that the particulate is not in contact with an edge portion of the recording/reproducing head on the stopper side even if the particulate enters in the stopper at most, and at least one portion of an uneven shape of the stopper is a curve.

10. A recording/reproducing apparatus comprising:

a first substrate on which a recording medium is mounted; and a second substrate which faces said first substrate and to which a recording/reproducing head is fixed, the recording/reproducing head performing at least one of information recording and information reproduction on the recording/reproducing medium and protruding toward the recording medium, is fixed, wherein said first substrate and said second substrate are disposed such that one surface of said first substrate faces another surface of said second substrate substantially parallel to each other, one of said first substrate and said second substrate is relatively displaced in a predetermined direction substantially parallel to the other of said first substrate and said second substrate, with respect to the other of said first substrate and said second substrate, a particulate is placed in a gap between the one surface of said first substrate and the another surface of said second substrate, (i) the particulate is capable of being displaced with displacement of at least one of said first substrate and said second substrate, (ii) the particulate has a substantially circular cross section in a direction that the one of said first substrate and said second substrate is displaced when the one of said first substrate and said second substrate is displaced, said second substrate comprises an uneven portion which protrudes toward said first substrate and whose at least one portion is a stopper for the particulate, a minimum radius of the particulate is deterrmined such that the particulate is not in contact with an edge portion of the recording/reproducing head on the stopper side even if the particulate enters in the stopper at most, and at least one portion of an uneven shape of the stopper is step-shaped.

* * * * *